(12) United States Patent
Risner et al.

(10) Patent No.: US 8,981,271 B1
(45) Date of Patent: Mar. 17, 2015

(54) DRIVE AND MULTI-STAGE MOUNTING ASSEMBLIES FOR RIGIDLY AFFIXING HELIOSTAT REFLECTORS

(75) Inventors: Jeremy Risner, Pasadena, CA (US); Ulrik Pilegaard, Woodland Hills, CA (US)

(73) Assignee: eSolar, Inc., Burbank, CA (US)

( * ) Notice: Subject to any disclaimer, the term of this patent is extended or adjusted under 35 U.S.C. 154(b) by 1040 days.

(21) Appl. No.: 12/806,775

(22) Filed: Aug. 20, 2010

Related U.S. Application Data

(60) Provisional application No. 61/237,644, filed on Aug. 27, 2009.

(51) Int. Cl.
  *G01C 21/02* (2006.01)
  *H01J 40/14* (2006.01)
  *G06M 7/00* (2006.01)

(52) U.S. Cl.
  USPC .................. 250/203.4; 250/239; 250/221

(58) Field of Classification Search
  CPC ......... Y02E 10/00; Y02E 10/41; Y02E 10/42; Y02E 10/43; Y02E 10/44; Y02E 10/45; Y02E 10/50; Y02E 10/52; Y02E 10/54; Y02E 10/541; Y02E 10/542; Y02E 10/543; Y02E 10/544; Y02E 10/545; Y02E 10/546; Y02E 10/547; Y02E 10/548; Y02E 10/549; F24J 2/407; F24J 2/4652; F24J 2002/4656; F24J 2002/4658; F24J 2002/4663; F24J 2002/4665; F24J 2002/4667; F24J 2/52; F24J 2/5201; F24J 2/5203; F24J 2/5205; F24J 2/5211; F24J 2/5228; F24J 2/253; F24J 2/5245
  USPC ........ 250/221, 239, 203.1, 203.3, 203.4, 216; 353/3; 126/569, 572, 573, 574, 576, 126/577, 578, 593, 600, 601, 605–607, 680, 126/684–694, 704; 359/853, 850, 851
  See application file for complete search history.

(56) References Cited

U.S. PATENT DOCUMENTS

| | | | | |
|---|---|---|---|---|
| 4,528,977 | A * | 7/1985 | Malley | 126/600 |
| 4,586,488 | A * | 5/1986 | Noto | 126/578 |
| 4,995,377 | A * | 2/1991 | Eiden | 126/605 |
| 7,252,084 | B2 * | 8/2007 | Pawlenko et al. | 126/605 |

* cited by examiner

*Primary Examiner* — Pascal M Bui Pho
(74) *Attorney, Agent, or Firm* — Brooks Acordia IP Law, PC; Pejman Yedidsion; Chris Weiss

(57) ABSTRACT

A comprising a ground mount, a reflector assembly comprising a mirror and a frame rigidly connected to the mirror, a drive assembly configured to rotate the reflector assembly with respect to the ground mount about a predetermined angular range, and a mounting mechanism configured to connect the drive assembly to the reflector assembly and comprising a shaft connected to the drive assembly, where the drive assembly is configured to rotate the shaft about a longitudinal axis of rotation, an attachment for connecting the frame to the shaft at a fixed angle about the longitudinal axis; and a clamp for connecting the shaft to the frame.

7 Claims, 15 Drawing Sheets

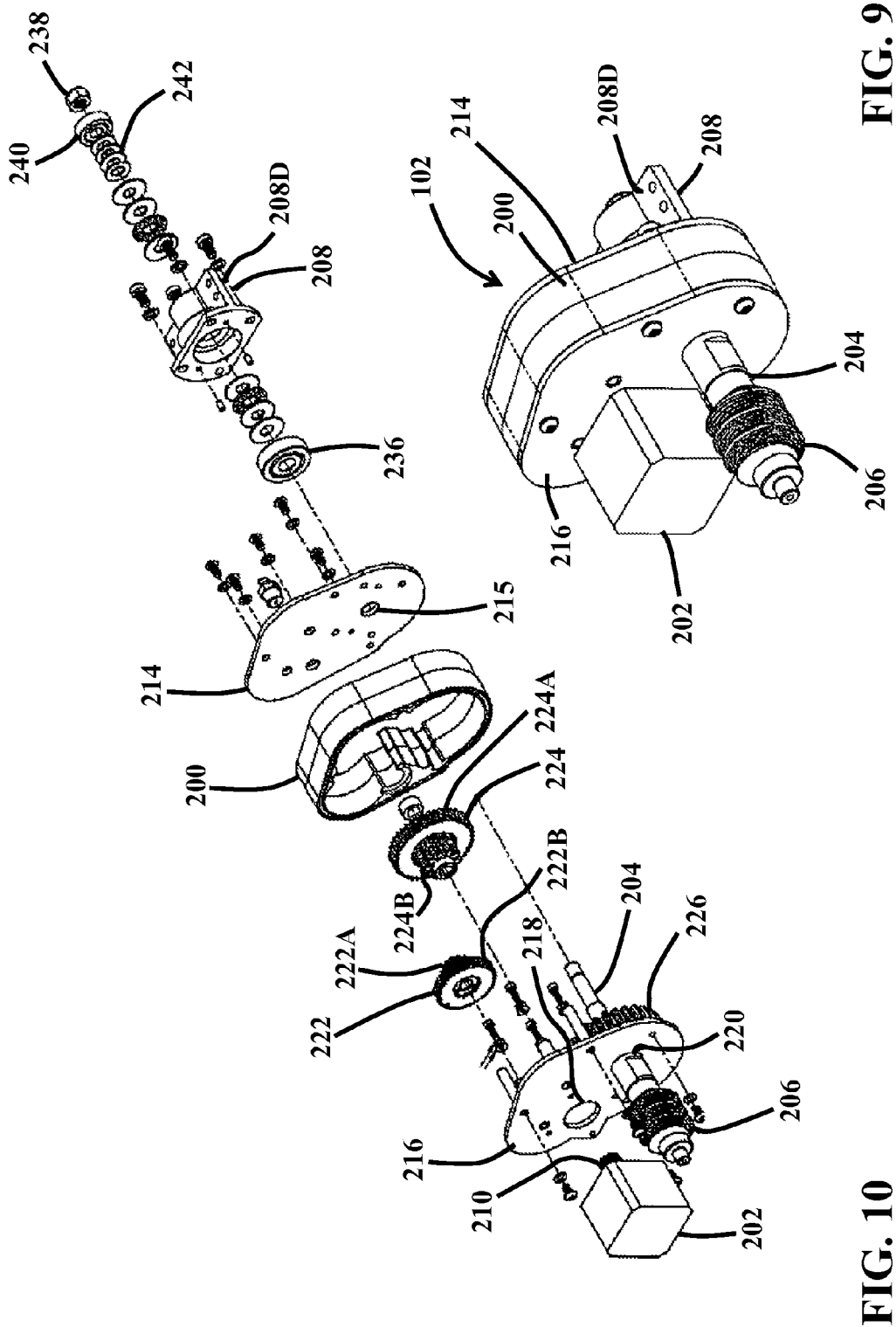

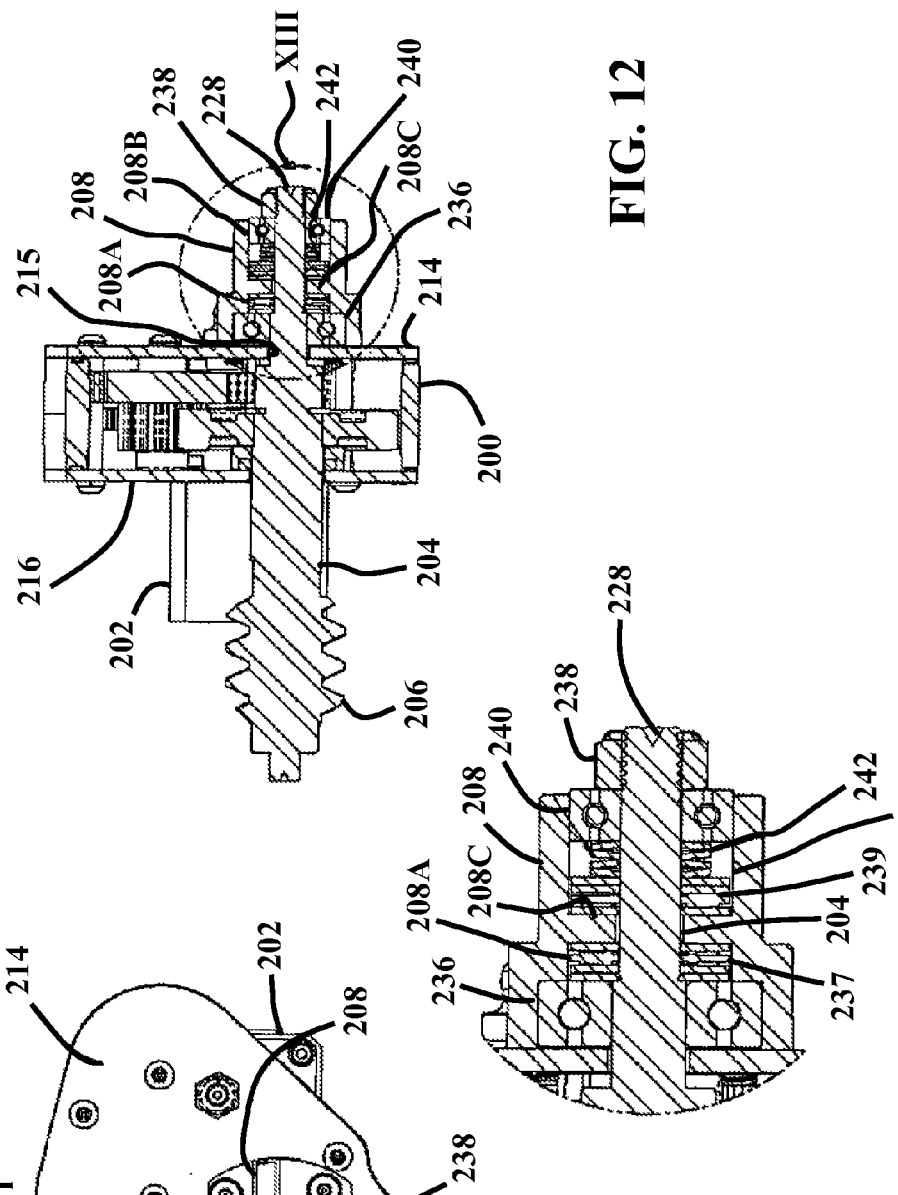
FIG. 12
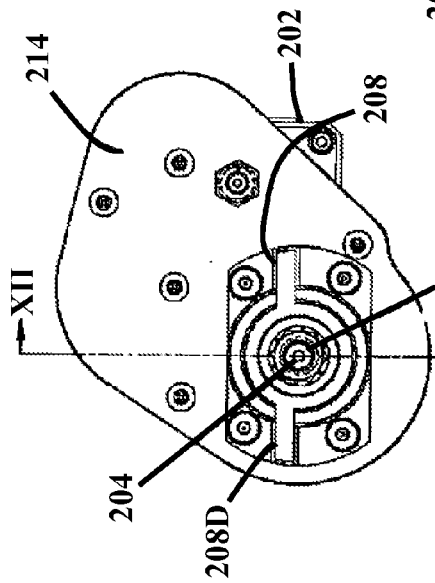
FIG. 11
FIG. 13

FIG. 17
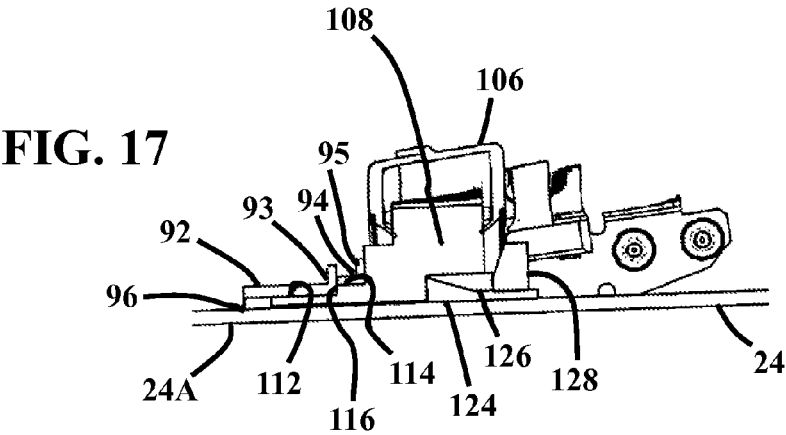
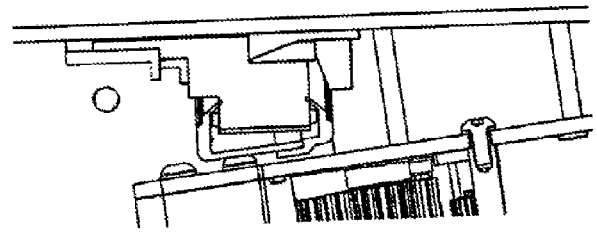
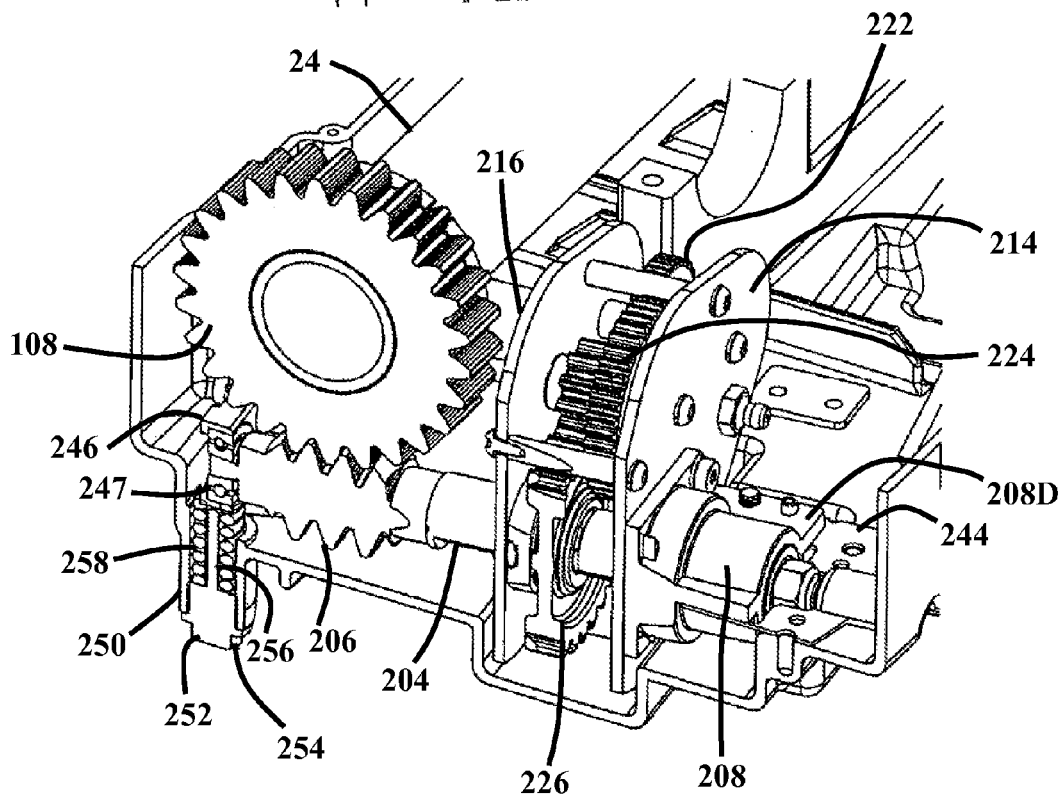
FIG. 15

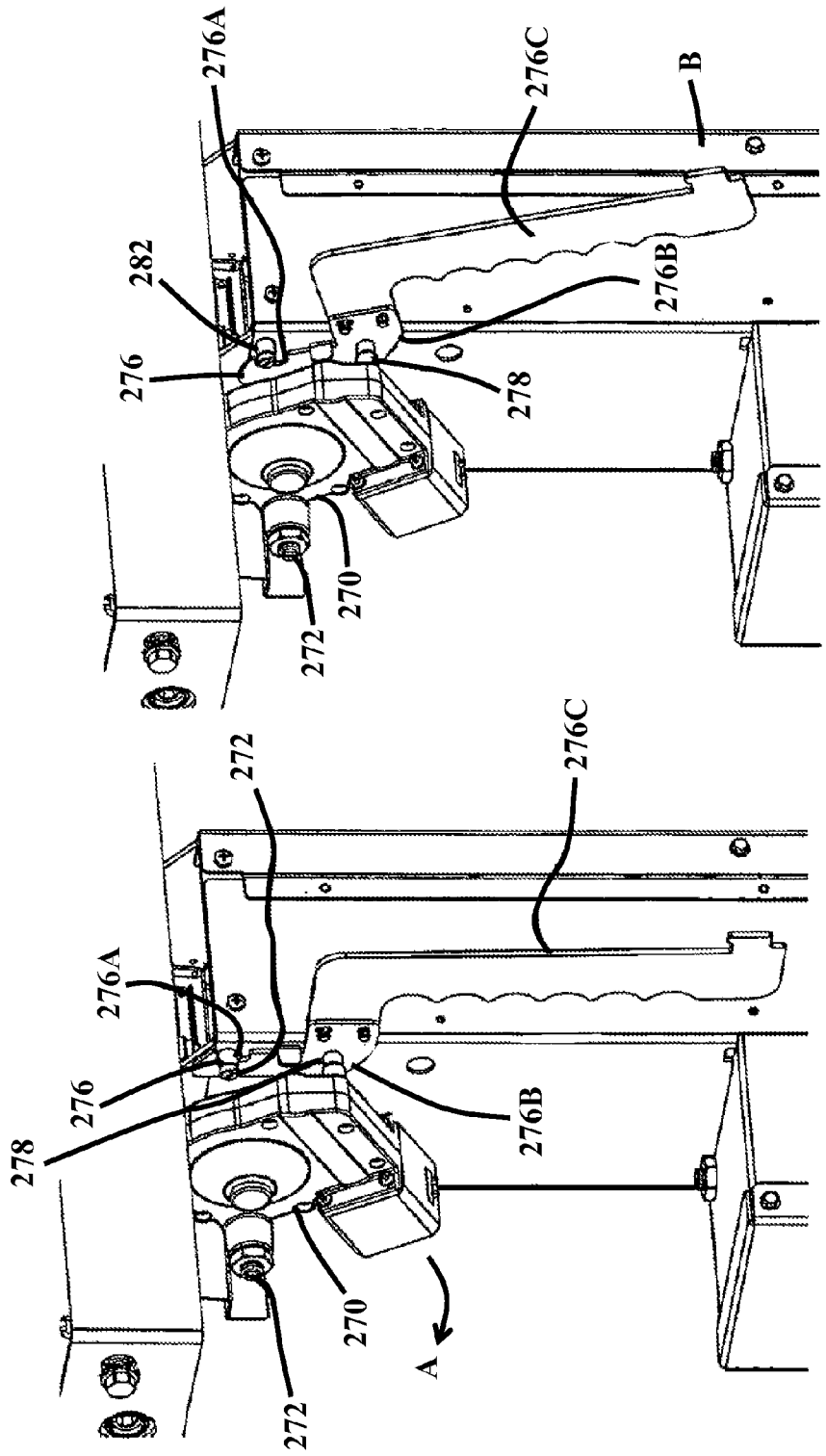

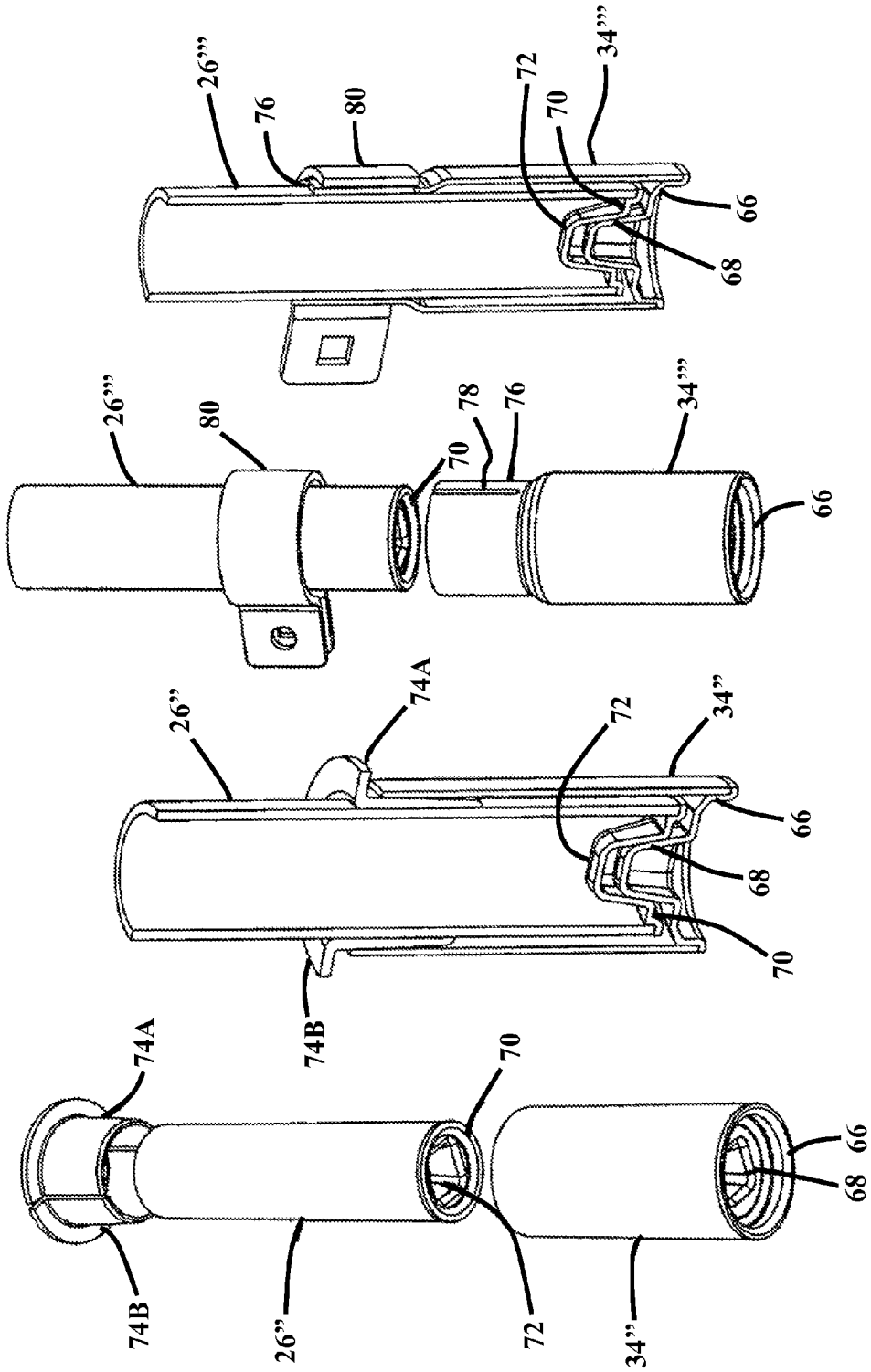

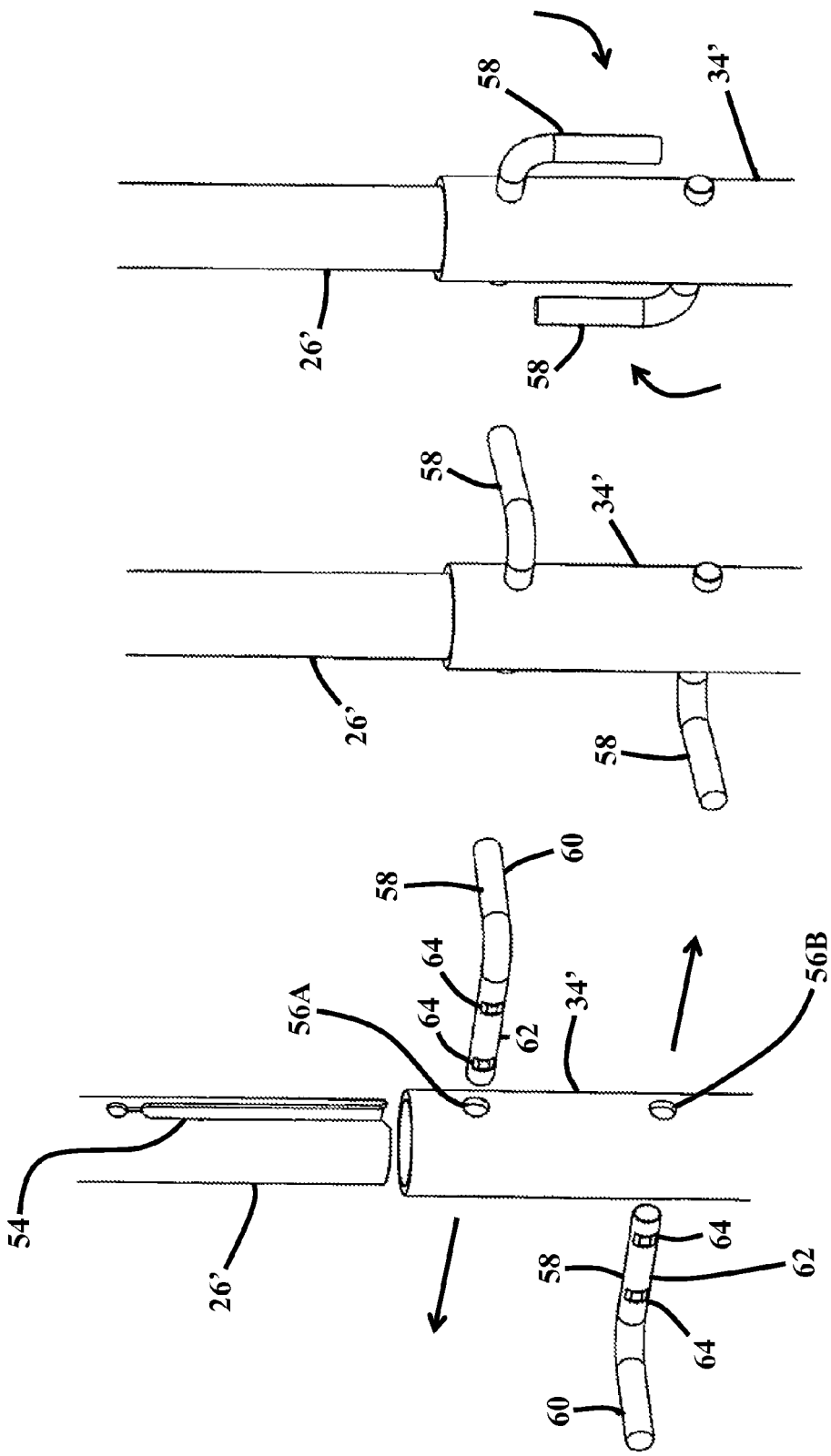

DRIVE AND MULTI-STAGE MOUNTING ASSEMBLIES FOR RIGIDLY AFFIXING HELIOSTAT REFLECTORS

CROSS-REFERENCE TO RELATED APPLICATIONS(S)

This application claims the benefit of U.S. Provisional patent application Ser. No. 61/237,644 filed Aug. 27, 2009, entitled "DRIVE AND MOUNTING ASSEMBLIES FOR A HELIOSTAT" which is hereby incorporated by reference herein for all purposes.

FIELD

This disclosure relates generally to heliostats having reflectors for use in redirecting sun light and, in particular, drive and mounting assemblies for heliostats.

BACKGROUND

In a central tower receiver power plant, an array of heliostats reflects sunlight toward a receiver mounted atop a tower. One type of receiver converts incident radiant energy into output high-pressure, high-temperature steam, which can later be fed to a turbine for electrical power generation. Heliostats are generally mounted on the ground in an area about the tower. Each heliostat has a rigid reflective surface, such as a mirror, capable of suntracking, that is, the surface takes on orientations throughout the day so as to optimally redirect sun light from the moving sun toward the receiver.

One approach is to have comparatively large heliostats but a smaller number of such heliostats. In such a power plant, the fewer number of heliostats can make it economical to manufacture very precise, and thus very expensive, components for the positioning of the reflective surfaces. Another approach, however, is to use comparatively small heliostats, such as with reflective surfaces that measure about 1 meter by 2 meters. On one hand, such an approach can be more efficient at redirecting sun light because there are more individually adjustable reflective surfaces. Such an approach can also advantageously facilitate installation because of their smaller sizes. For example, a two man crew could readily install such heliostats. On the other hand, however, more heliostats equates to more drive assemblies required for the heliostats and more steps for installation that must be repeated. Accordingly, there is a need for heliostat assemblies that are both economical to manufacture and efficient to install.

One problem with controlling the positioning of reflectors of heliostats is that movement is preferred only in a predetermined, controlled manner. This is because accurate positioning of the reflectors is necessary to maintain efficiency of the power plant. However, wind and other environmental factors can apply loads to the reflector that move the reflector away from its preferred orientation at a given point in time of tracking the sun. Manufacturing tolerances between the components of the heliostat can contribute to backlash, undesirable movement and non-linearity in the drive systems. This can result in a greater amount of variation between the predetermined and the actual reflector orientation. While springs and other devices can be used to reduce the impact of the manufacturing tolerances, the desire to reduce the costs of manufacture of the components—particularly when a comparatively large number are required due to smaller reflector sizes—limits the amount of pointing error that can be designed out of a typical heliostat drive.

Another problem with heliostat assemblies is that the reflector is relatively flexible. The reflector of the heliostat can have a size of about 1 meter in height and about 2 meters in length. The thickness, however, may only be about 3 or 4 millimeters. Due to these dimensions and its primarily glass composition, in the case where the reflector is a glass mirror, the reflector is relatively flexible. Flexing of the reflector from a substantially planar orientation is undesirable because it can reduce the efficiency of the reflector in redirecting sunlight. To provide support for the reflector and reduce flexing, a frame is attached to the back side of the reflector. The frame includes a plurality of longitudinally extending tubes and a plurality of transversely extending tubes connecting the longitudinally extending tubes. In order to attach the elevation shaft of the drive assembly to the frame of the reflector, a bracket can be attached at each end of the elevation shaft, the shaft and brackets positioned between a pair of transverse tubes of the frame, and then bolts extending parallel to the elevation shaft used to secure the brackets to the adjacent transverse tube of the frame. Such an arrangement can disadvantageously result in undesirable flexing of the frame and hence the reflector when the bolts are tightened. For example, the two transverse members to which the elevation tube is anchored, via the brackets, can be drawn toward each other, resulting in a concave, convex or twisted reflector surface.

SUMMARY

The invention features a heliostat for tracking the sun and redirecting sunlight to a receiver such as a solar thermal receiver. The invention in an exemplary embodiment includes a ground mount; a reflector assembly comprising a mirror and a frame rigidly connected to the mirror; a drive assembly configured to rotate the reflector assembly with respect to the ground mount about a predetermined angular range; a mounting mechanism configured to connect the drive assembly to the reflector assembly. The mounting mechanism may include: (i) a shaft connected to the drive assembly, wherein the drive assembly is configured to rotate the shaft about a longitudinal axis of rotation; (ii) an attachment for connecting the frame to the shaft at a fixed angle about the longitudinal axis; and (iii) a clamp for connecting the shaft to the frame. The longitudinal axis of rotation may be substantially horizontal to adjust the mirror's elevation angle or substantially vertical to adjust the mirror's azimuth angle. The attachment may also include a bracket and bolts or other fasteners to detachably attach the bracket to the mirror frame. The bracket may be welded to the shaft or connected by means of a keyed hole that prevents the shaft from rotating with respect to the bracket.

The invention is some embodiments is a heliostat comprising: a ground mount; a reflector assembly comprising a mirror and a frame rigidly connected to the mirror; and a drive assembly configured to rotate the reflector assembly with respect to the ground mount about a predetermined angular range. The drive assembly may comprise: (i) a shaft connected to the mirror frame; (ii) a spur for rotating the shaft; and (iii) a worm configured to drive the spur; wherein the worm is biased in a direction substantially perpendicular to both an axis of rotation of the spur and an axis of rotation of the worm. The drive assembly may include a spring for biasing the worm, and the backlash between the worm and the spur reduced to less than one thousandth of a radian in spur rotation.

BRIEF DESCRIPTION OF THE DRAWINGS

FIG. 9 is a perspective view of one of the gear assemblies of FIG. 8;

FIG. 10 is an exploded perspective view of the gear assembly of FIG. 9;

FIG. 11 is a rear elevation view of the gear assembly of FIG. 9;

FIG. 12 is a section view of the gear assembly of FIG. 9 taken along line XII-XII thereof;

FIG. 13 is a detailed view of region XIII of the section view of FIG. 12;

FIG. 15 is a partial section view taken along line XV-XV of FIG. 8 and showing driving engagement between the output worm gear of the gear assembly and the spur gear of the elevation shaft;

FIG. 17 is a section view of the seating arrangement for the spur gear of FIG. 16 relative to the housing of FIG. 8;

FIG. 22 is a partial perspective view of an alternative drive assembly showing a locking feature in a locked configuration that can be disengaged to permit manual rotation of the elevation shaft;

FIG. 23 is a partial perspective view similar to FIG. 22 but showing the locking feature in an unlocked configuration permitting a gearbox to be rotated to disengage a gearbox pinion from a spur gear of the elevation shaft to allow manual rotation of the elevation shaft;

FIG. 26 is a partial perspective view of a first alternative for securing the azimuth shaft of the drive assembly to a tubular post;

FIG. 27 is a section view of the components of FIG. 26 taken along a longitudinal axis of the azimuth shaft;

FIG. 28 is a partial perspective view of a second alternative for securing the azimuth shaft of the drive assembly to a tubular post;

FIG. 29 is a section view of the components of FIG. 28 taken along a longitudinal axis of the azimuth shaft;

FIG. 30 is a partial exploded perspective view of a third alternative for securing the azimuth shaft of the drive assembly to a tubular post;

FIG. 31 is a perspective view of the components of FIG. 30 partially assembled; and FIG. 32 is a perspective view of the components of FIG. 30 fully assembled.

DETAILED DESCRIPTION OF THE DRAWINGS

Figure 1:
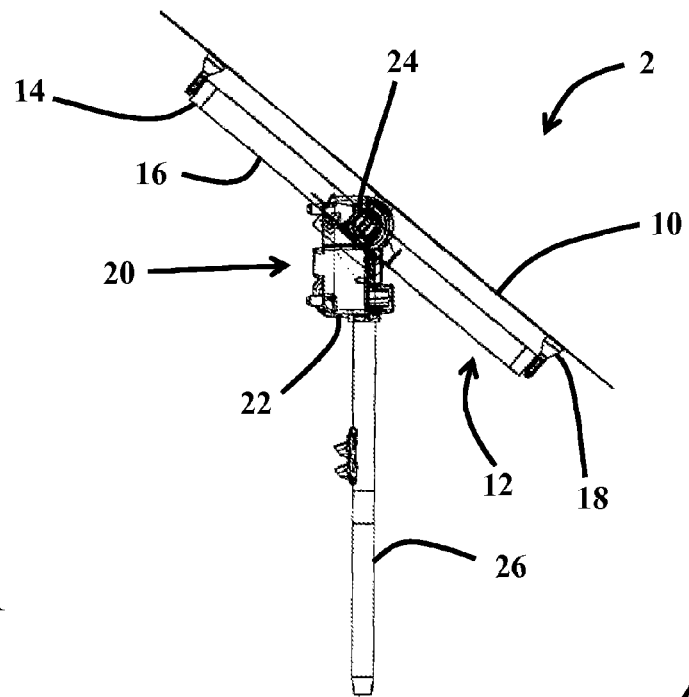
FIG. 1 is a side elevation view of part of a heliostat showing a reflector having a frame attached to an elevation shaft of a drive assembly.

The heliostat 2 includes a drive assembly 20 attached to a reflector 10, in this example a glass mirror. The drive assembly 20 is controlled to orientate the reflector 10 to redirect sun light toward a central collector. The sun light can be used to heat a fluid in the central collector, such as water, for generating steam. The steam, in turn, can then be used to turn a turbine, for example, for generating electricity. The drive assembly 20 of the heliostat 2 can be used to both rotate and change the angle of inclination of the reflector 10. This permits the reflector 10 to be positioned throughout a period of time to track the sun and redirect sun light toward the central collector. The drive assembly 20 of the heliostat 2 is configured to rotate the reflector 10 about a generally vertical axis and, in particular, about an azimuth shaft 26. To change the angle of inclination of the reflector 10, the drive assembly 20 is configured to tilt the reflector 10 about a generally horizontal axis and, in particular, about an elevation shaft 24. An array of such heliostats can be arranged in the manners described in U.S. Publ. Appl. No. 2009/0133685, the disclosure of which is hereby incorporated by reference in its entirety. As will be described in detail herein, and with reference to FIGS. 1-32, an exemplary embodiment of the drive assembly 20 is configured to permit simplified assembly and installation, reduce the impact of manufacturing tolerances in the control and positioning of the reflector 10, and to provide for improved positioning and control of the reflector 10 using the driving assembly 20.

ATTACHMENT OF DRIVE ASSEMBLY TO FRAME OF REFLECTOR

Figure 2:
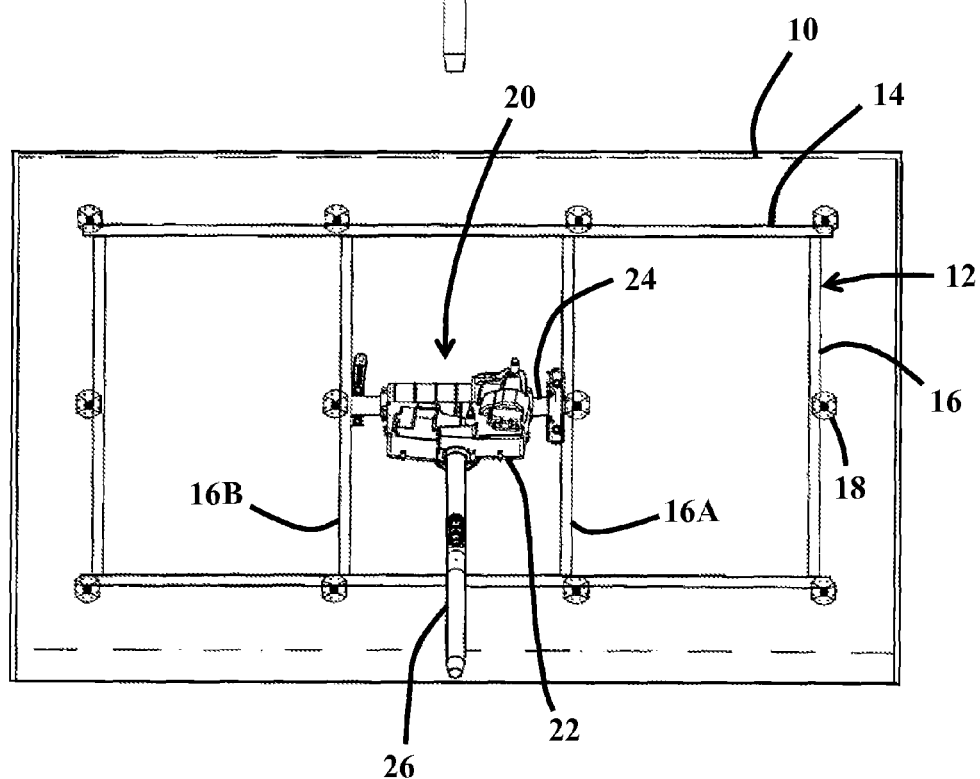
FIG. 2 is a rear view of the heliostat of FIG. 1 in the plane of the reflector and showing the frame attached to the elevation shaft of the drive assembly.

The drive assembly 20 of the heliostat 2 is mounted to the reflector 10 using an intermediate frame 12, as illustrated in FIGS. 1 and 2. The frame 12 provides for both a location to mount the drive assembly 20 and for structurally supporting the comparatively thin reflector 10. The frame 12 includes a pair of longitudinally extending, parallel tubes 14, disposed adjacent and parallel to each of the longitudinal edges of the reflector 10. A plurality of transversely extending tubes 16 are perpendicular to and connected the longitudinal tubes 14, such as by welding, bolts, brackets or other such methods of fastening. The frame 12 is then attached, such as by welding, bolts, brackets or other such methods of fastening, to a plurality of posts 18 which in turn are attached, such as by using an adhesive, to the back side of the reflector 10.

The elevation shaft 24 of the drive assembly 20 is positioned between a pair of transverse tubes 16a and 16b of the frame 12 supporting the reflector 10, as illustrated in FIG. 2. Positioning the elevation shaft 24 between the pair of transverse tubes 16a and 16b advantageously permits the elevation shaft 24 (and hence the axis of inclination for the reflector 10) to be positioned close to the center of gravity of the reflector 10. This beneficially can result in reduced loads that must be born by the drive assembly 20 and reduced motor loads required to rotate and tilt the reflector 10.

In order to secure the drive assembly 20 relative to the reflector 10, with reduced deformation of the reflector 10 while permitting ease of assembly, a multi-stage mounting mechanism is used. With reference to the example of FIGS. 3-6, in the first stage, one end 24a of the elevation shaft 24 is loosely secured in position relative to one of the pair of transverse tubes 16a of the frame 12. In the second stage, an opposite end 24b of the elevation shaft 24 is loosely placed into position relative to the other of the pair of transverse tubes 16b of the frame 12. In the third stage, the one end 24a of the elevation shaft 24 is tightly secured to the one of the pair of transverse tubes 16a. During this third stage, some movement is permitted between the opposite end 24b of the elevation shaft 24 and the other of the pair of transverse tubes 16b of the frame 12. Finally, in the fourth stage the opposite end 24b of the elevation shaft 24 is tightly secured to the other of the pair of transverse tubes 16b. In this manner, the tightly securing of the opposite end 24b of the elevation shaft 24 relative to the frame 12 results in significantly less deformation of the frame 12 and hence the reflector 10 as compared to the prior method described above. Moreover, the tolerances between the components do not need to be as precise as in the prior method because any deviation in the components can be compensated for by the fact that only the one end 24a of the elevation shaft 24 is fixed in a permanent position relative to the frame 12; the opposite end 24b is permitted to shift relative to the frame 12 after the third stage and prior to the final securing of the fourth stage. Securing the elevation shaft 24 to the frame 12 results in the remainder of the drive assembly 20 being secured relative to the frame 12 and thus the reflector 10.

Figure 5:
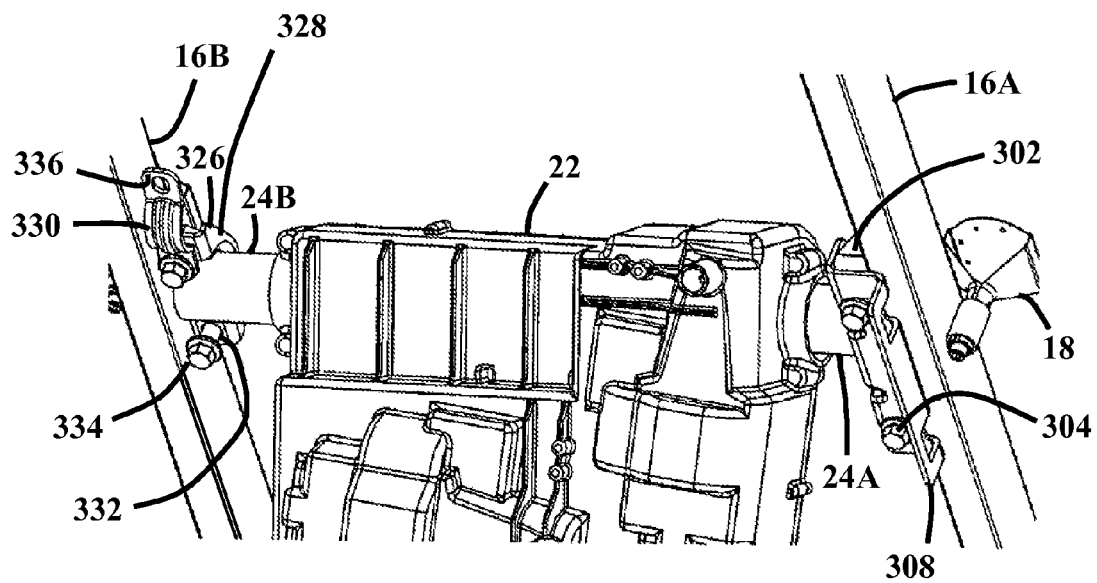
FIG. 5 is a partial perspective view of the rear of the heliostat of FIG. 1 showing the first end of the elevation shaft attached to the frame of the reflector and the second end of the elevation shaft seated in an open clamp.
Figure 6:
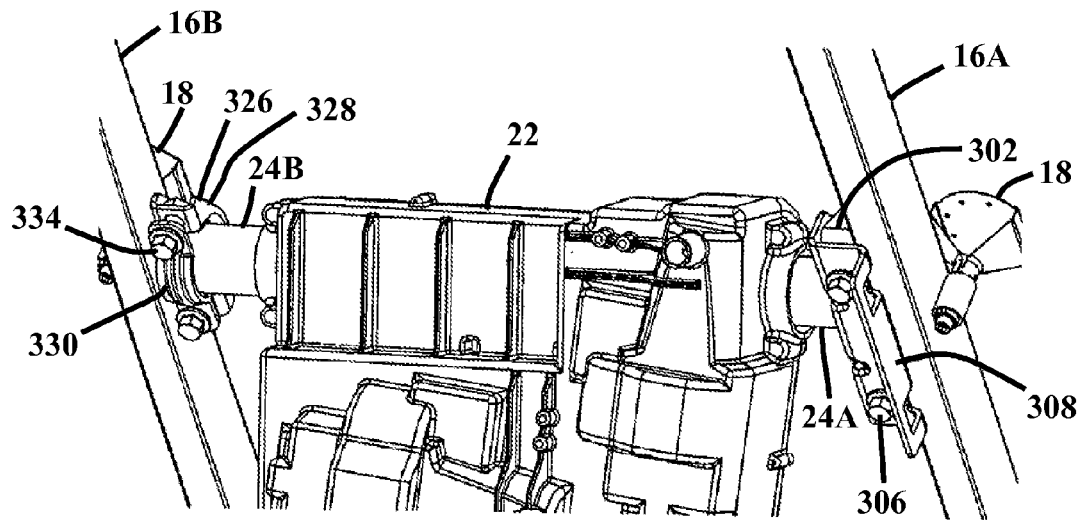
FIG. 6 is a partial perspective view of the rear of the heliostat of FIG. 1 showing the first end of the elevation shaft attached to the frame of the reflector and the second end of the elevation shaft seated in a closed clamp and attached to the frame.
Figure 7:
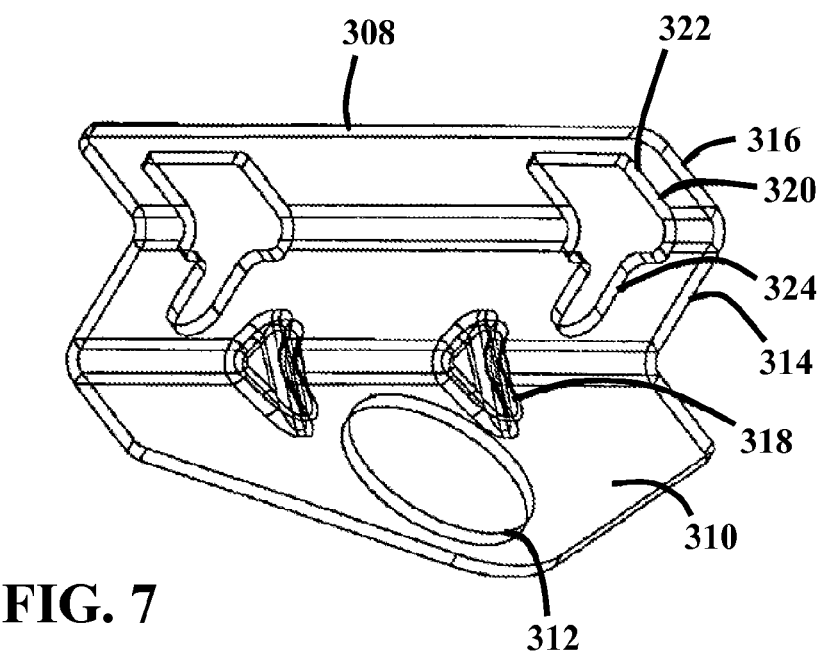
FIG. 7 is a perspective view of a bracket for use in attaching the first end of the elevation shaft to the frame.
Figure 14:
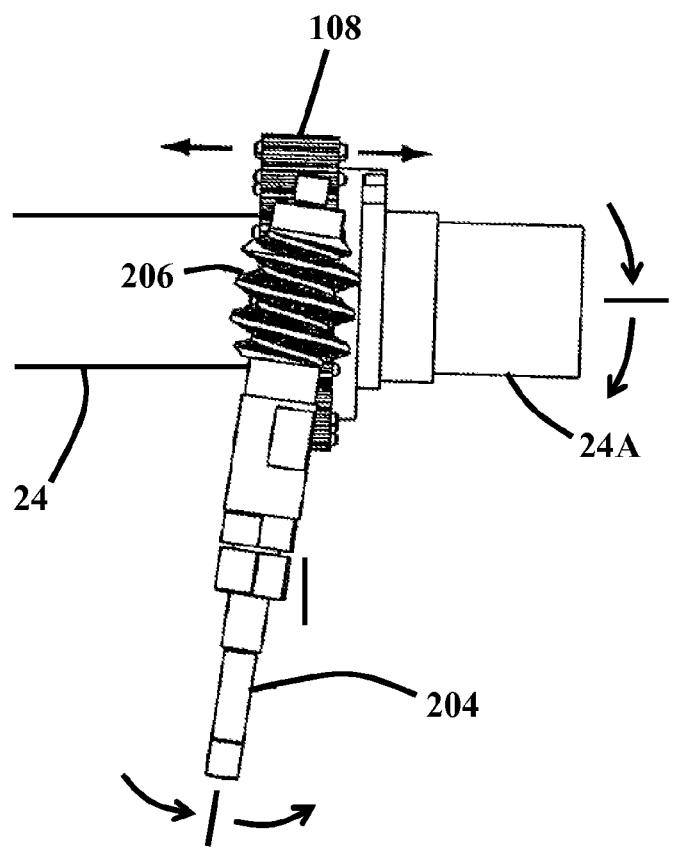
FIG. 14 is a partial detailed view showing an output worm of the gear assembly engaged with a spur gear of the elevation shaft of FIG. 8.

Turning now to more of the details of the mounting mechanism used for the one end 24a of the elevation shaft 24, an L-shaped bracket 302 is attached to a side of the one of the transverse tubes 16a of the frame 12, facing the other of the transverse tubes 16b, as illustrated in FIGS. 3-6. The attachment may be made by welding, bolts, adhesive or the like. A Z-shaped bracket 308 is rigidly attached to the one end 24a of the elevation shaft 24 by means of welding, bolts, press-fitting, keyed shaft, adhesives or the like. Shaft 24, in turn, is attached to the L-shaped bracket 302 of the frame 12 using bolts or screws 306. More specifically, and as illustrated in FIG. 7, the Z-shaped bracket 308 has an intermediate segment 314 with first segment 316 extending generally perpendicularly thereto at one edge and a second segment 310 also extending generally perpendicularly thereto but at another edge of the intermediate segment 314 and in an opposite direction from the first segment 316. Bosses 318 may be formed between the intermediate segment 314 and either or both of the first and second segments 316 and 310 to strengthen the Z-shaped bracket 308. A pair of openings 320 extend through the first segment 316 and the intermediate segment 314 at an intersection thereof. The openings 320 are configured to receive the screws 306 extending through openings 304 of the L-shaped bracket 302. The openings 320 of the Z-shaped bracket 308 include an enlarged portion 322 positioned in the first segment 316 and a narrowed portion 324 positioned in the intermediate segment 314, the functions of which will be described in greater detail herein. The second segment 310 includes an opening 312 for receiving the first end 24a of the elevation shaft 24, such as in a press-fit arrangement.

Turning now to more of the details of the mounting mechanism used for the opposite end 24b of the elevation shaft 24, a clamp 326 is attached to a side of the other of the transverse tubes 16b of the frame 12, facing the one of the transverse, tubes 16a to which the L-shaped bracket 302 is attached, illustrated in FIGS. 3-6. The clamp 326 includes a bottom clamp portion 328 having an inwardly curved, semi-circular mid-section with a pair of flanges at each end. The bottom clamp portion 328 is attached to the other of the transverse tubes 16b of the frame 12, such as by welding, bolts, adhesives and the like. A removable top clamp portion 330 also has an inwardly curved, semi-circular mid-section with a pair of flanges at each end. When apertures 336 in the flanges of the top clamp portion 330 are aligned with apertures 332 in the bottom clamp portion 328, bolts or screws 334 can be used to join the top and bottom clamp portions 328 and 330 together with the opposite end 24b of the elevation shaft 24 therebetween.

Figure 3:
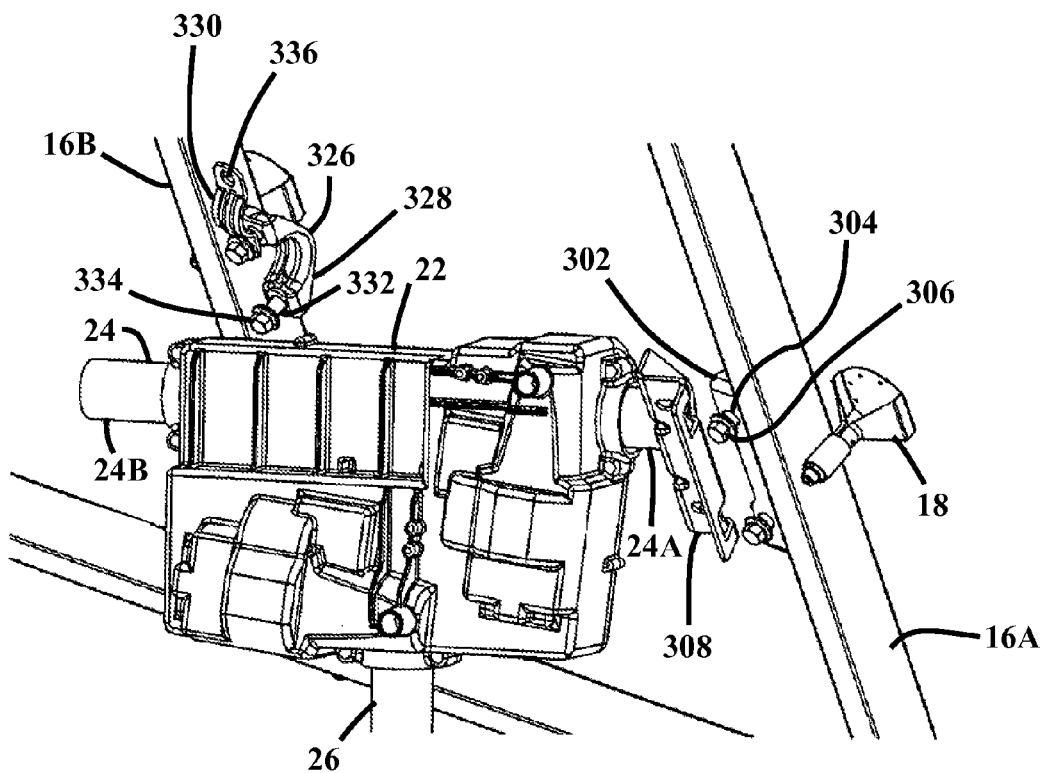
FIG. 3 is a partial perspective view of the rear of the heliostat of FIG. 1 showing the elevation shaft unattached to the frame of the reflector.
Figure 4:
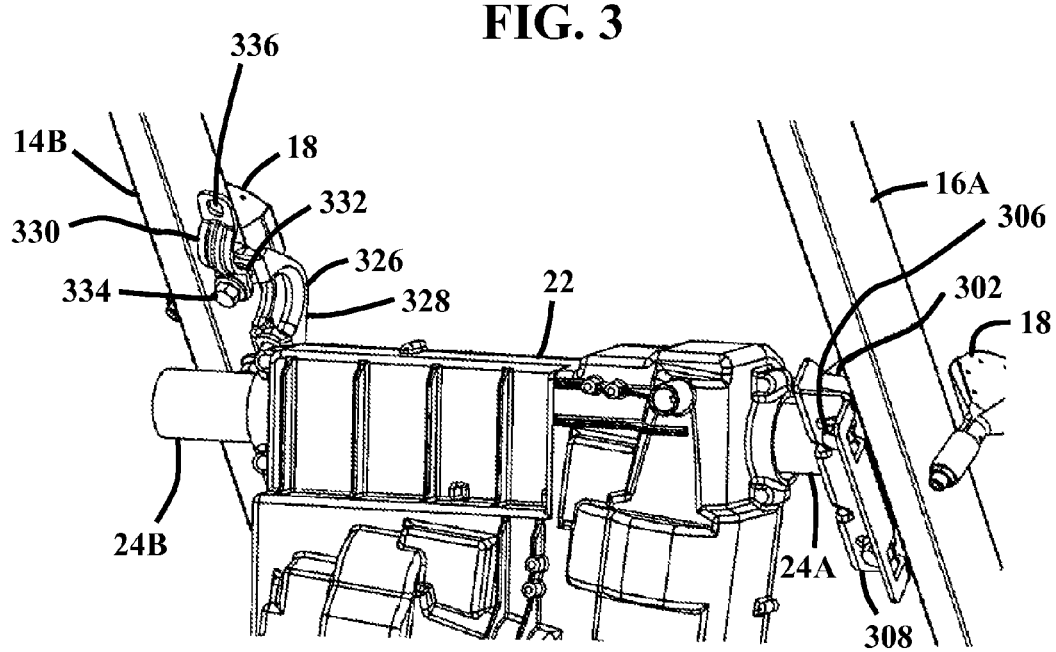
FIG. 4 is a partial perspective view of the rear of the heliostat of FIG. 1 showing a first end of the elevation shaft attached to the frame of the reflector and a second end of the elevation shaft unattached to the frame of the reflector.

As discussed above, in the first stage of the mounting mechanism the one end 24a of the elevation shaft 24 is loosely secured in position relative to the one of the pair of transverse tubes 16a of the frame 12. In particular, the Z-shaped bracket 308 attached at the one end 24a of the elevation shaft 24 is positioned adjacent the screws 306 which are in a position with their heads spaced from the L-shaped bracket 302, as illustrated in FIG. 3. The Z-shaped bracket 308 can be loosely secured relative to the L-shaped bracket 302 by inserting the heads of the screws 306 into the enlarged portions 322 of the openings 320 with the Z-shaped bracket 308 at an angle, moving from the position illustrated in FIG. 3 to the position illustrated in FIG. 4. The heads of the screws 306 are sized to enter the enlarged portion 322 of the openings 320 and then the Z-shaped bracket 308 is moved to position the shafts of the screws 306 in the narrowed portions 324 of the openings 320 so that the heads of the screws 306 limit outward movement of the Z-shaped bracket 308 relative to the L-shaped bracket 302.

Once the first stage of the mounting mechanism is complete, and the one end 24a of the elevation shaft 24 is loosely secured in position relative to the one of the pair of transverse tubes 16a of the frame 12 using the L-shaped bracket 302, Z-shaped bracket 308 and screws 306, the opposite end 24b of the elevation shaft 24 is loosely placed into the open clamp 326, as illustrated in FIG. 5. In particular, the opposite end 24b of the elevation shaft 24 is loosely placed into the semi-circular mid-section of the bottom clamp portion 328, which in turn is secured to the other of the transverse tubes 16b of the frame 12. The third stage of the mounting mechanism is to then tighten the screws 306 to secure the Z-shaped bracket 308 to the L-shaped bracket 302 to tightly secure the one end 24a of the elevation shaft 24 relative to the one of the transverse tubes 16a of the frame 12. During the tightening of the screws 306, the position of the opposite end 24b of the elevation shaft 24 in the bottom clamp portion 328 is generally free to shift, both in the axial and circumferential directions. This advantageously permits the fourth stage of the mounting mechanism—the tight clamping of the opposite end 24b of the elevation tube 24 in the clamp 326—to take place with the opposite end 24b of the elevation tube 24 in a position whereby reduced stresses will be placed on the frame 12 and hence twisting of the reflector 10 is also reduced. For example, manufacturing tolerances between the relative positions of the transverse tubes 16a and 16b of the frame 12, as well as among other components of the frame 12 and mounting hardware, can be readily accommodated by shifting of the opposite end 24b of the elevation shaft 24 in the third stage. In the fourth and final stage, the top clamp portion 330 is placed over the bottom clamp portion 328 with the opposite end 24b of the elevation shaft 24 between the respective semi-circular mid-sections, the respective flanges and openings 332 and 336 aligned, and the screws 334 tightened to tightly secure the opposite end 24b of the elevation tube 24 to the clamp 326 and thus relative to the frame 12 and reflector 10, the final arrangement of which is illustrated in FIG. 6. In addition to readily accommodating manufacturing tolerances, the illustrated example of the multi-stage mounting mechanism advantageously can permit the drive assembly 20 to be mounted and dismounted relative to the reflector 10 with minimal steps, requiring only four screws to be turned.

POWERTRAINS OF DRIVE ASSEMBLY

Figure 8:
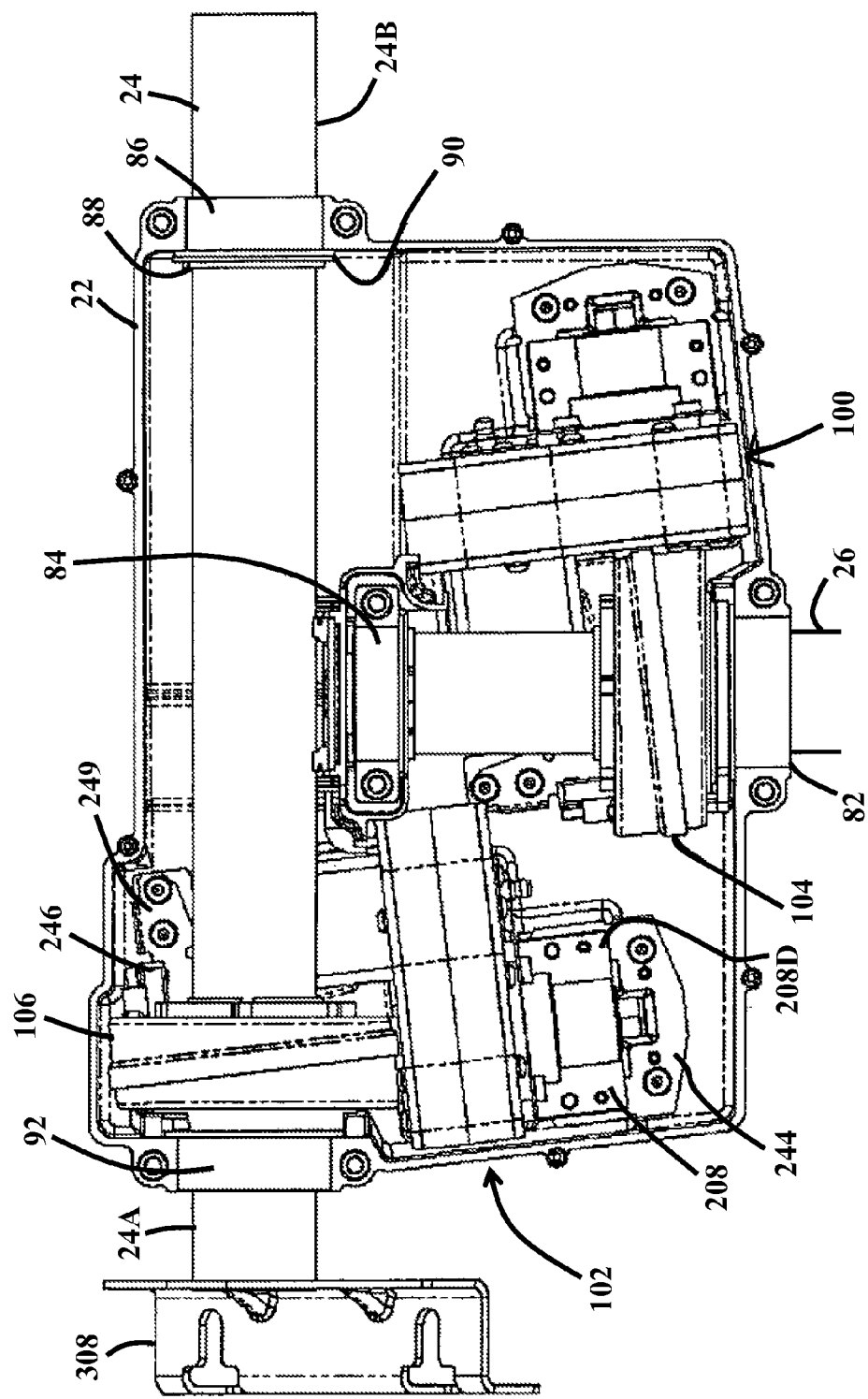
FIG. 8 is a front elevation view of a housing of the drive assembly with a cover of the housing removed to show a pair of gear assemblies each associated with one of the elevation and azimuth shafts for driving the shafts for rotation.

The drive assembly 20 includes a housing 22 which encloses the power trains for driving the azimuth shaft 26 and the elevation shaft 24 for relative rotation about their respective axes and relative to the housing 22, an example of which is illustrated in FIG. 8. In particular, one of the power trains 100 can be used to drive the housing 22 for rotation, and hence the elevation shaft 24 and attached reflector 10, relative to the azimuth shaft 26, which is stationary. This can permit rotation of the reflector 10 about a vertical axis when the azimuth shaft 26 is mounted vertically. The other of the power trains 102 can be used to drive the elevation shaft 24 for rotation about its axis and relative to the housing 22 for changing the inclination angle of the reflector 10 relative to a horizontal axis when the elevation shaft 24 is mounted horizontally (and perpendicular to the axis of the azimuth shaft 26). Each of the power trains 100 and 102 is independently driven by an associated electrical motor, as will be described in greater detail herein. When driven by the associated electrical motor, each of the power trains 100 and 102 operates to rotate the respective shaft 24 or 26 via a spur gear fixedly mounted on each of the shafts 24 or 26.

Figure 20:
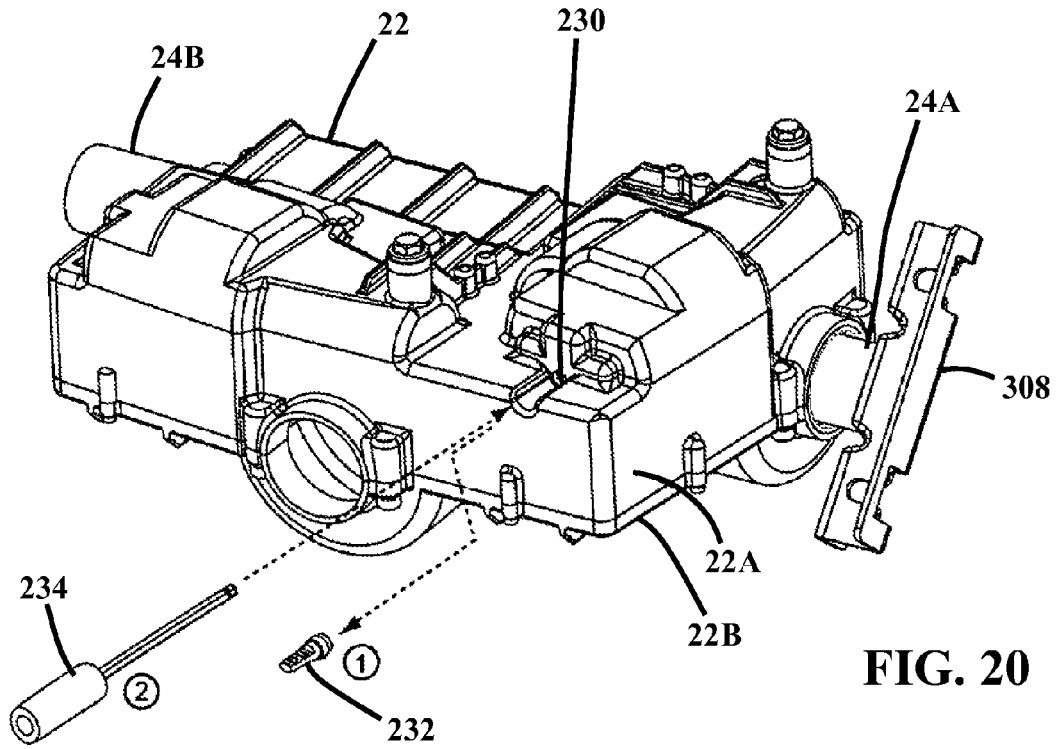
FIG. 20 is a perspective view of the housing of the drive assembly of FIG. 1, and showing a tool being insertable into an opening thereof for manual rotation of the elevation shaft.

The housing 22 includes two half-shells 22a and 22b, as illustrated in FIG. 20, which are fastened together, such as by using screws or bolts, to form an enclosure. The housing 22 has a pair of transversely aligned openings through with the ends 24a and 24b of the elevation shaft 24 protrude, as well as a bottom opening through which the majority of the azimuth shaft 26 protrudes, as illustrated in FIG. 8.

Within the housing 22 is the power train 100 and associated spur gear for driving the housing 22 relative to the azimuth shaft 26, the power train 102 and associated spur gear 108 for driving the elevation shaft 24 about its longitudinal axis, as well as bearing arrangements for supporting the shafts 24 and 26. In order to facilitate ease of assembly and reduce costs for manufacture, each of the power trains 100 and 102 is essentially identical. Similarly, the bearing structures share many of the same components. As such, the basic components and their operation of the power train 100 associated with the azimuth shaft 26 are the same as the power train 102 associated with the elevation shaft 24 and, thus, will not be described in separate detail.

Turning first to the power trains 100 and 102, and with reference to the power train 102 for driving the elevation shaft 24 for rotation, the electric motor 202 drives a gear reduction arrangement which includes an output worm 206 which in turn drives the spur gear 108 mounted to the elevation shaft 24, as illustrated in FIG. 15. Instead of aligning the worm 206 with a conventional worm gear (having teeth inclined relative to the axis of rotation), the worm 206 is aligned with the spur gear 108 (having teeth aligned parallel to the axis of rotation). Furthermore, the axis of rotation for the spur gear 108 (which is the same axis of rotation as the elevation shaft 24 to which it is mounted) may be at an angle θ greater than 90 degrees from the axis of rotation of the worm 206, and, for example, may be 96.75 degrees, as depicted by way of example in FIG. 14. This results in an angle of about 6.75 degrees between the teeth of the spur gear 108 and the axis of rotation of the worm 206. In addition, the worm 206 is biased into engagement with the spur gear 108 using a spring 258, wherein the spring is readily replaceable to permit different springs (having different spring forces) to be selected in order to optimize the performance.

There are several advantages that result from the arrangement of the spring-biased worm 206 and spur gear 108. A first advantage is that forward drive efficiency can be maximized while backward drive efficiency can be reduced to just below zero. In other words, rotation of the worm 206 can drive the spur gear 108 for rotation (and hence the elevation shaft 24). Conversely, rotation of the spur gear 108 will not cause the worm 206 to rotate. Thus, this spring-biased gearing arrangement functions as a brake and reduces backlash, while still permitting drivability. What this means is that external loads on the reflector 10, such as wind loads, will not cause the reflector 10 to substantially deviate from its orientation, which advantageously can lead to the benefit of more precise positioning of the reflector 10 to redirect sunlight in a highly controlled manner. A second advantage of this arrangement is that the axial alignment between the spur gear 108 and the worm 206 does not have to be to a high degree of precision. This is because the angle of inclination of the worm 206 results in a point of contact between the teeth of the worm 206 and the teeth of the spur gear, as opposed to a line of contact typical of conventional worm to worm gear arrangements. Due to the point of contact between the teeth of the worm 206 and the teeth of the spur gear 108, the manufacturing tolerances can be reduced and more readily accommodated.

The torque flow path from the motor 202 to the spur gear 108 mounted on the elevation shaft 24 goes through the gear reduction arrangement to reduce the high rotational speeds output by the electric motor to the speed suitable for rotating the elevation shaft 24, as illustrated in FIGS. 9 and 10, and may, for example be a reduction of about 700:1. The motor 202 has an output shaft upon which a motor pinion 210 is mounted and driven for rotation. The pinion 210 intermeshes with a first stage gear 222, and in particular with a first stage spur gear 222b. A first stage pinion 222a is either on the same hub or integrally formed with the first stage spur gear 222b and thus rotates therewith. The first stage pinion 222a in turn intermeshes with a second stage gear 224, and in particular with a second stage spur gear 224a. Either integrally formed or mounted to the same hub as the second stage spur gear 224a is a second stage pinion 224b. The second stage pinion 224b intermeshes with an output spur gear 226 which is mounted to a middle portion of a worm shaft 204. Mounted on one end portion of the worm shaft 204 is the worm 206. The worm 206 is arranged to intermesh with the spur gear 108 mounted to the elevation shaft 24, as described in greater detail above and as illustrated in FIG. 15. Thus, rotation of the output shaft of the motor 202 causes rotation of the motor pinion 210, which in turn rotates the first stage gear 222, which in turn rotates the second stage gear 224, which in turn rotates the output spur gear 226, which in turn rotates the worm shaft 204.and the worm 206 thereon, which in turn rotates the spur gear 108 mounted to the elevation shaft 24 thereby rotating the elevation shaft 24 and changing the angle of inclination of the reflector 10.

The first stage gear 222, the second stage gear 224 and the output spur gear 226 are disposed within a housing formed by a continuous housing surround 200 with housing plates 214 and 216 at each end, as illustrated in FIG. 9. One of the plates 216 has an opening 218 through which the motor pinion 210 is inserted, as well as an opening 220 through which the worm shaft 204 protrudes. An opposite end of the worm shaft 204 protrudes through an opening 215 in the other of the plates 214. Various mounts extend between the plates 214 and 216 to both sandwich the surround 200 therebetween and, in some instances, function as shafts about which the first stage gear 222 and second stage gear 224 can rotate.

A shaft support 208 is mounted to one of the plates 214 and supports the end portion of the worm shaft 204—opposite the end portion having the worm 206 thereon—for rotation. The shaft support 208 includes a first cylindrical recess 208a adjacent the plate 214 of the enclosure and a second cylindrical recess 208b adjacent the tip of the worm shaft 204, as illustrated in FIGS. 12 and 13. An annular divider 208c separates the first and second recesses 208a and 208b. A first roller bearing 236 is disposed with the first recess 208a and a second roller bearing 240 is disposed with the second recess 208b to support the worm shaft 204 for rotation at two axially spaced locations. The first roller bearing 236 is disposed on an enlarged diameter portion of the worm shaft 204, thereby creating a step. A nut 238 is threaded onto external threads at the tip of the worm shaft 204 to hold the worm shaft 204 in position. Also positioned within the first cylindrical recess 208a is a thrust bearing assembly 237, with a caged cylindrical roller assembly positioned between two thrust washers, disposed between the first bearing 236 and the divider 208c of the shaft support 208 and, more particularly, between the step of the worm shaft 204 and the divider 208c. Another thrust bearing assembly 239 is likewise positioned in the second cylindrical recess 208b. Furthermore, a set of spring washers 242 are positioned within the second cylindrical recess 208b between the thrust washers 239 and the second bearing 240. The thrust bearing assemblies 237 and 239 and spring washers 242 cooperate with the shaft support 208 to permit some axial shifting of the worm shaft 204 relative to the remainder of the gear reduction arrangement during operation. In an alternative arrangement, the relative positions of the spring washers 242 and the roller bearing 240 can be switched from that illustrated. This can advantageously permit more accurately torquing of the nut 238 to a known preload with reduced impact of any friction between the outside diameter of the roller bearing 240 and the inside diameter of the second recess 208b.

The power train 102 is supported relative to the housing 22 at two locations, with the exception of the spur gear 108 mounted to the elevation shaft, as illustrated in FIG. 15. The first location at which the power train 102 is supported adjacent the shaft support 208 at the end portion of the worm shaft 204 opposite the end having the worm 206 thereon. The second location is at the opposite end of the worm shaft 204 adjacent the worm 206. The first support location for the power train 102 is via a live hinge 244 attached at one end to lateral flanges 208d of the shaft support 208 and at the other end to the inner surface of the housing 22. The live hinge 244 is generally planar and arranged so that there is minimal movement of the worm shaft 204 permitted along its longitudinal axis, but yet the worm 206 at the opposite end of the shaft 204 can move a small amount toward or away from the spur gear 108 mounted to the elevation shaft 24. The opposite end of the worm shaft 204, having the worm 206 thereon, is supported by an arm 246 having at one end a bearing 247 receiving the end of the worm shaft 204 and at the opposite end a second live hinge 249 mounted to an inner surface of the housing 22, as illustrated in FIG. 8. The second live hinge 249 is also generally planar and orientated so that minimal movement of the worm shaft 204 perpendicular to its longitudinal axis is permitted, while at the same time permitting the pivoting of the worm shaft 204 about the first live hinge 244.

The one end of the arm 246 having the bearing 247 is biased toward the spur gear 108 of the elevation shaft 24 using a compression spring 258 received in a bore 250 in the housing 22, as illustrated in FIG. 15. In this embodiment, the spring 258 exerts a force on the worm 206 in a direction that is substantially perpendicular to both the worm's axis of rotation and the spur gear's 108 axis of rotation. A threaded plug 252 is removably inserted into the bore 250 to hold the spring 258 in place, and includes a head 254 with a stem 256 for supporting the spring 258. The spring 258 functions to bias the worm 206 into engagement with the spur gear 108, advantageously permitting accommodation of manufacturing tolerances in the relative positioning of the spur gear 108 and the worm 206. Furthermore, adjustments to the spring force and thus the engagement force between the worm 206 and the spur gear 108 can readily be made after assembly of the housing 22 and its internal components simply by removing the plug 252, substituting a different spring having a different spring force, and then reinserting the plug 252 and substituted spring into the bore 250. The use of the readily replaceable spring 258 permits the optimum spring force to be selected in order to maximize forward drive efficiency while maintaining non-back-drivability of the elevation shaft 24. More specifically, a spring 258 can be selected to optimize the coefficient of friction between the worm 206 and the spur gear 108 and thus the back-drivability thereof.

BEARING AND SPUR GEAR STRUCTURE FOR THE ELEVATION AND AZIMUTH

SHAFTS

The elevation shaft 24 is mounted for rotation relative to the housing 22 in a manner that accommodates manufacturing tolerances by minimizing the number of components (each with their own manufacturing tolerance) contributing to the overall tolerance, as will be apparent from the description herein.

The spur gear 108 is secured to the one end 24a of the elevation shaft 24 using a three part locking assembly, as illustrated in FIG. 17. The locking ring assembly includes a sleeve 124 with an inclined ramp at one end. The sleeve 124 fits between an inner diameter of a recess of the spur gear 108 and an outer diameter of the elevation shaft 24. A wedge 126 is driven between the sleeve 124 and the inner diameter of the recess of the spur gear 108 via an actuator 128. The wedge 126 has a tapered end sized to ride along the inclined ramp of the sleeve 124, with the end result of providing a compressive force between the inner diameter of the recess of the spur gear 108 and the outer diameter of the elevation shaft 24, thereby securing the spur gear 108 both axially and against rotation relative to the elevation shaft 24. A lubrication housing 106 can optionally be provided to substantially enclose the spur gear 108 and the worm 206 and to permit and retain lubrication therebetween. Axially-extending protuberances 124 may be provided on the teeth of the spur gear 108 to ensure spacing between the interior surfaces of the lubrication housing 106 and the spur gear 108. A similar configuration is used for the mounting of the spur gear associated with the power train 100 of the azimuth shaft 26, and thus will not be separately described in detail.

Figure 16:
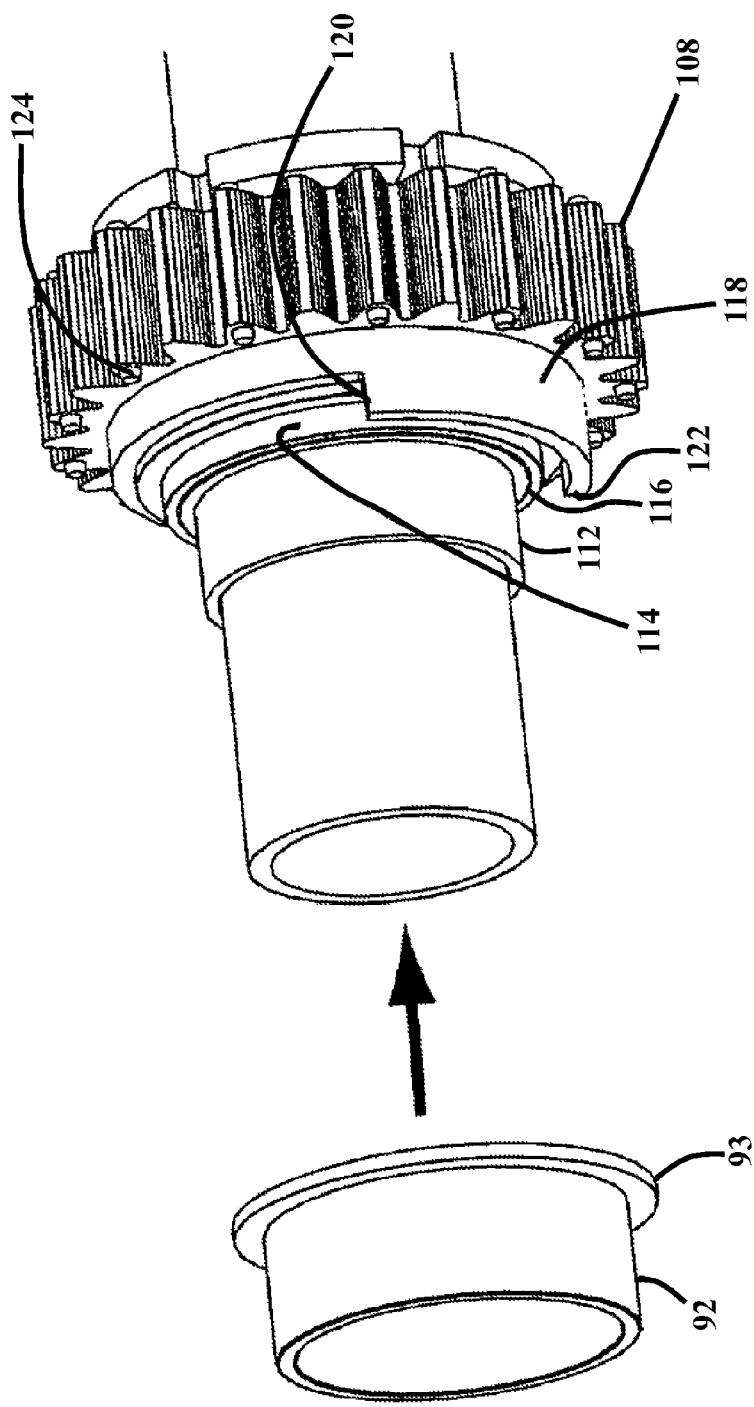
FIG. 16 is an exploded perspective view of the spur gear of the elevation shaft and a plain bearing for seating the spur gear relative to the housing of FIG. 8.

A plurality of annular segments are formed on an opposite end of the spur gear 108 from the recess used for accommodating the locking assembly, each having an increasing diameter. There is a first, outward segment 112 and a second segment, as illustrated in FIG. 16. A step 16 is formed between the first and second segments 112 and 114. A first plain bearing 92 is seated on the first, outward segment 112, as illustrated in FIG. 17, providing a bearing, surface between a machined seat of the housing 22 and the spur gear 108 (and hence the elevation shaft 24 to which it is mounted). A flange 93 of the first plain bearing 92 abuts against the step 116 between the first and second segments 112 and 114 of the spur gear 108, and functions to both reduce friction as well as limit axial movement of the elevation shaft 24 relative to the housing 22. This arrangement provides a tolerance stack between the spur gear 108 and the housing 22 which includes the machined seat of the housing 22, the first plain bearing 92, and then the spur gear 108 and, in particular, the first segment 112 thereof. This is less of a tolerance stack than if a separate bearing structure, whether plain or roller bearing, was provided directing on the elevation shaft 24 because the elevation shaft 24 is no longer part of the tolerance stack between the seat of the housing 22 and the spur gear 108. Thus, maintenance of concentricity between the spur gear 108 and the elevation shaft 24 can be improved, thereby assisting in improved accuracy of control of the reflector 10 mounted relative to the elevation shaft 24. A similar arrangement including a plain bearing 82 can be used for the azimuth shaft 26.

The opposite end 24b of the elevation shaft 24 can also use a plain bearing 86 between the machined seat of the housing 22 and the elevation shaft 24, as illustrated in FIG. 8. The plain bearing 86 of the opposite end 24b of the elevation shaft 24 can be retained against axially inward movement using a retaining ring 88 seated in a groove in the elevation shaft 24 and spaced by a washer 90 from a flange of the plain bearing 86, the flange also engaging the housing 22 to limit axially outward movement of the elevation shaft 24. A similar plain bearing 84 and mounting arrangement can be used for the azimuth shaft 26.

In order to limit rotation of the elevation and azimuth shafts 24 and 26, hard stops are provided at each end of the desired rotation extent. In addition to limiting rotation beyond the extent desired, and thereby limit potential damage to the reflectors such as by collision with adjacent reflectors or with other structures of the drive assemblies 20 or their mounting components, the hard stops can also function to provide a "home position" or "zero" whereby the precise position of the reflector 10 can be determined without reference to operation of a motor, such as a stepping motor. This can be particularly useful during calibration of the drive assemblies 20, such as disclosed in U.S. Pub. Appl. No. 2009/0107485, the disclosure of which is hereby incorporated by reference. The hard stops may be configured, for example to permit about 80 degrees of rotation of the elevation shaft 24 (measured from a position where the reflector 10 is horizontal) and about 540 degrees of rotation of the azimuth shaft 26.

Figure 18:
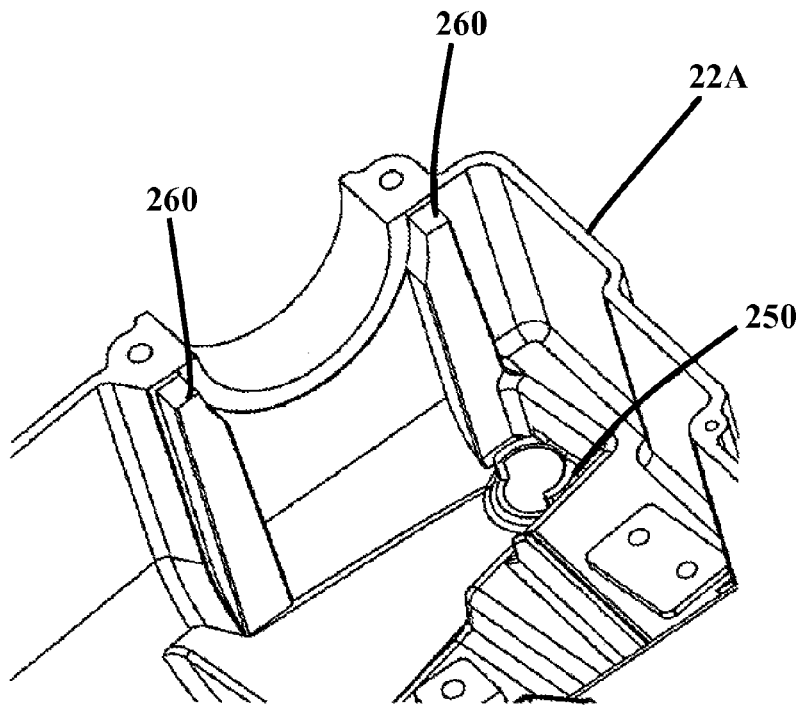
FIG. 18 is a perspective view of a portion of the interior of the housing of FIG. 8 with the internal components removed and showing interior stops for use in limiting rotation of the spur gear.
Figure 19:
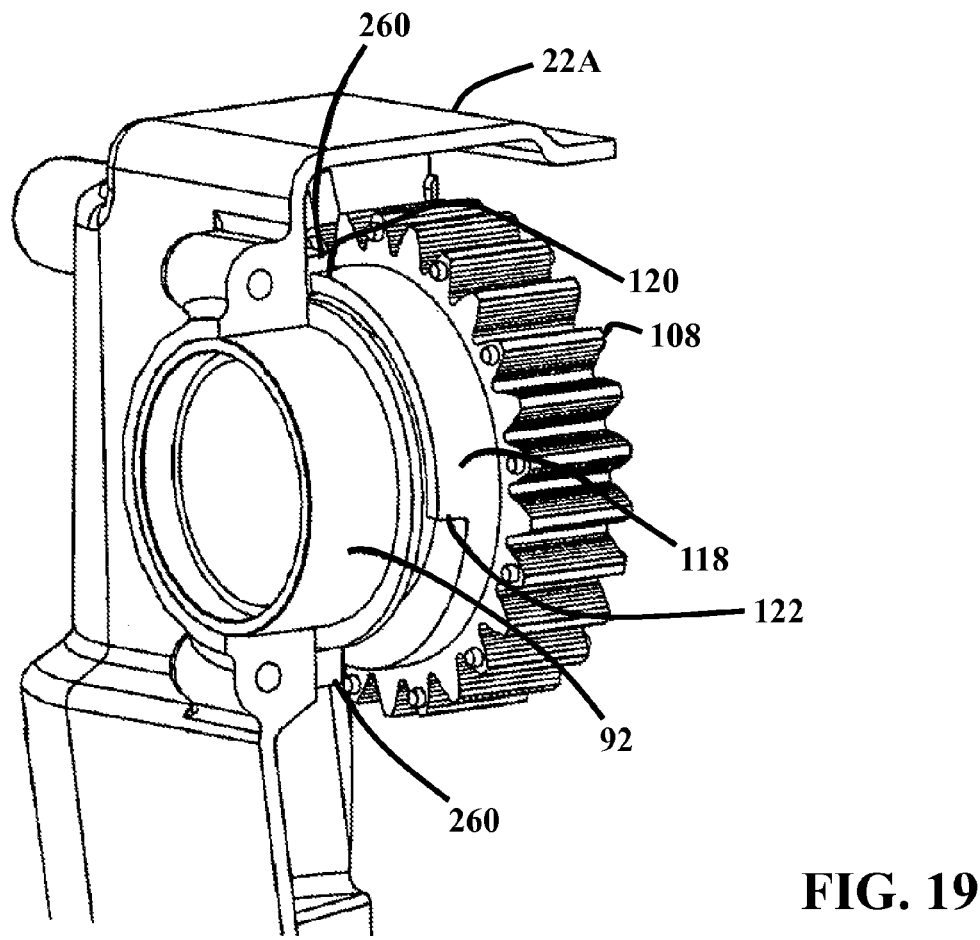
FIG. 19 is a perspective view of the portion of the interior of the housing of FIG. 18 and showing the spur gear seated relative to the housing.

The hard stops are preferably formed directly between the spur gears and the adjacent inner surfaces of the housing 22. With reference first to the spur gear 108 of the elevation shaft 24, the spur gear 108 has a raised, arcuate segment 118, the ends of which form spur stop surfaces 120 and 122, as illustrated in FIG. 16. The spur gear associated with the azimuth shaft 26 preferably has an identical construction. The spur stop surfaces 120 and 122 are configured to engage with housing stop surfaces 260 machined or otherwise formed in the inner surfaces of the shell 22a of the housing 22 adjacent the seat for the plain bearing 92, as illustrated in FIGS. 18 and 19. The arcuate spacing between the spur stop surfaces 120 and 122, as well as the arcuate spacing between the housing stop surfaces 260, function to limit the amount of rotation of the elevation shaft 24. In the illustrated example of FIGS. 16, 17 and 19, the housing stop surfaces 260 are 180 degrees apart and the arcuate spacing between the spur stop surfaces 120 and 122 is 100 degrees, thereby limiting rotation of the elevation shaft 24 to 80 degrees.

As will be appreciated, it would not be possible to have a rotation of 360 degrees regardless of the arcuate spacing between the spur stop surfaces 120 and 122 and the housing stop surfaces 260 using the above-described structure alone. In order to accommodate rotational movement of greater than 360 degrees, an intermediate follower is used. Such an arrangement is used between the spur gear of the azimuth shaft 26 and the housing 22. The spur gear associated with the azimuth shaft 26 is of identical construction as the spur gear 108 associated with the elevation shaft 24 and described herein and depicted in the figures referenced herein. Hence, the follower will be described with reference to that spur gear 108, it being understood that the follower being preferred for use only with the spur gear associated with the azimuth shaft. The follower is a ring having a radially extending protuberance with a ring stop surface formed on each side. The follower is dimensioned to be seated on a second plain bearing 94, which in turn is seated on the second segment 114 of the spur gear 108, as illustrated in FIG. 17. The follower is positioned between the flange 93 of the first plain bearing 92 and the flange 95 of the second plain bearing 94 on the spur gear 108. The corresponding pair of housing hard stops may also be machined or otherwise formed in the interior surfaces of the shell 22a of the housing. The housing hard stops for the follower may be closely spaced, and may be spaced about the same distance as the spacing of the ring stop surfaces of the follower. Rotation of the spur gear 108 in one direction will first cause one of the spur stop surfaces to engage with one of the ring stop surfaces, at which point the follower will now rotate with the spur gear 108 until the other of the ring stop surfaces abuts one of the housing stop surfaces. This sequence can be repeated in reverse when the spur gear 108 is rotated in the opposite direction.

MANUAL MOVEMENT OF THE ELEVATION AND AZIMUTH SHAFTS

Figure 21:
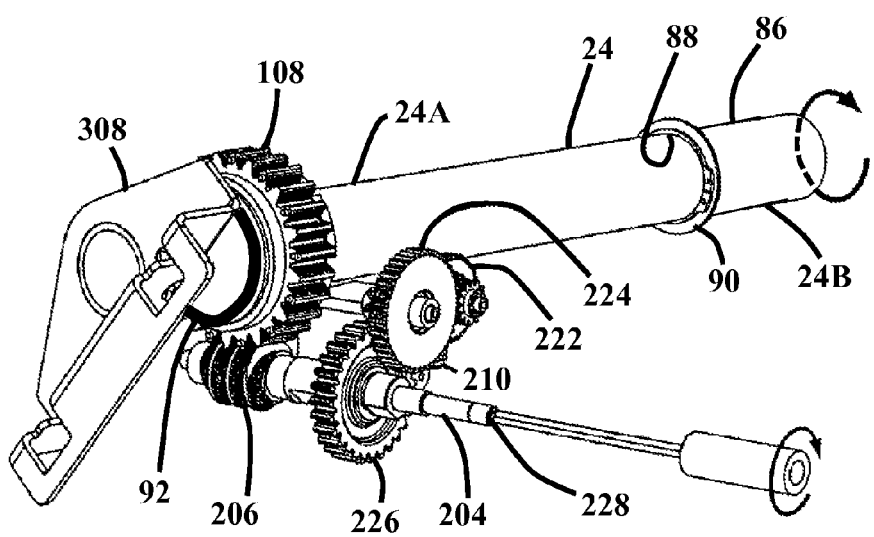
FIG. 21 is a partial perspective view of the gear assembly and spur gear of the elevation shaft being manually rotated using the tool of FIG. 20.

The power train 102 is configured to permit manual rotation of the elevation shaft 24. Manual rotation of the elevation shaft 24 may be desirable such as to reposition the reflector 10 after the drive assembly 20 has been installed. For example, if the motor 202 is no longer working or if the reflector 10 needs to be positioned in a manner to facilitate access to certain components of the drive assembly 20 or other structures. The tip of the worm shaft 204 is configured with a socket 228. The socket 228 is aligned with an opening 230 in one of the shells 22a of the housing 22, as illustrated in FIG. 20. A plug 232, such as a screw, can normally cover the opening 230. Removal of the plug 232 exposes the opening and permits insertion of a drive end of a tool 234 configured with a complementary portion for engaging the socket 228 and driving the worm shaft 204 for rotation, and thereby rotate the worm 206, the spur gear 108 mounted to the elevation shaft 24, and hence the elevation shaft 24, as illustrated in FIG. 21, and the reflector 10 mounted relative thereto. The tool 234 may be driven manually or electrically, such as with the aid of an electric drill or screwdriver. While the manual adjustment of the reflector 10 has been described with respect to the elevation shaft 24 and its associated power train 102, a similar arrangement can be used to manually operate the power train 100 associated with the azimuth shaft.

In an alternative construction of a drive assembly, a gear box 270, and a pinion disposed therein, is pivotable into and out of engagement with a spur gear mounted on an elevation shaft. The gear box 270 includes an electric motor for driving the gears within the gear box 270 and, in turn, the spur gear mounted on the elevation shaft. The gear box 270 is pivotable about a pivot 272, as illustrated in FIGS. 22 and 23. The gear box 270 (and pinion therein) is biased toward engagement with the spur gear of the elevation shaft by an extension spring (not shown) secured between a post 278 mounted on the gear box 270 and a post 282 mounted relative to a stationary housing. A locking arm 276 has an intermediate section 276*b* pivotably attached to the post 278 mounted on the gear box 270. The locking arm 276 also has an upper section with a hook and recess 276*a*, as well as an oppositely extending extension 276*c*. The hook and recess 276*a* is positioned to receive the post 282 mounted relative to the stationary housing, and the recess is dimensioned with a length permitting some movement of the gear box 270 relative to the spur gear of the elevation shaft. However, the hook will engage the post 282 mounted to the stationary housing to prevent the gear box 270 from being pivoted in the direction indicated by arrow A to such a degree that its pinion is no longer engaged with the spur gear of the elevation shaft, as illustrated in FIG. 22. Instead, to permit such pivoting of the gear box 270 and disengagement of the pinion from the spur gear, the extension 276*c* of the lock arm 276 must first be manually shifted in the direction of arrow B, as illustrated in FIG. 23, thereby moving the post 282 of the stationary housing away from engagement with the hook and recess 276*a*. Once disengaged, the gear box 270 can be pivoted about the pivot 272 to extend the spring, disengage the pinion thereof from the spur gear of the elevation shaft and the reflector attached relative to the elevation shaft can then be manually positioned. While this manual adjustment has been described with respect to the elevation shaft and its gear box 270, the same structure and methods can be used to manually disengage a similar gear box associated with the azimuth shaft.

ATTACHMENT OF DRIVE ASSEMBLY TO MOUNTING POST

In order to permit quick and simple installation of the drive assembly 20, the end of the azimuth shaft 26 opposite the housing 22 is configured to be slid into a tubular mounting post 34 and then secured in position. The tubular mounting post 34 is in turn part of a larger foundational assembly. The azimuth shaft 26 and the mounting post 34 are configured to restrict both relative rotational and axial movement and in predetermined axial and radial orientations, thereby ensuring that multiple drive assemblies 20 and, in particular, the elevation tube 24 and thus the reflector 10 of each, can be positioned in a generally predetermined and easily repeatable manner, such as when multiple drive assemblies 20 are to be mounted in an array.

Figure 24:
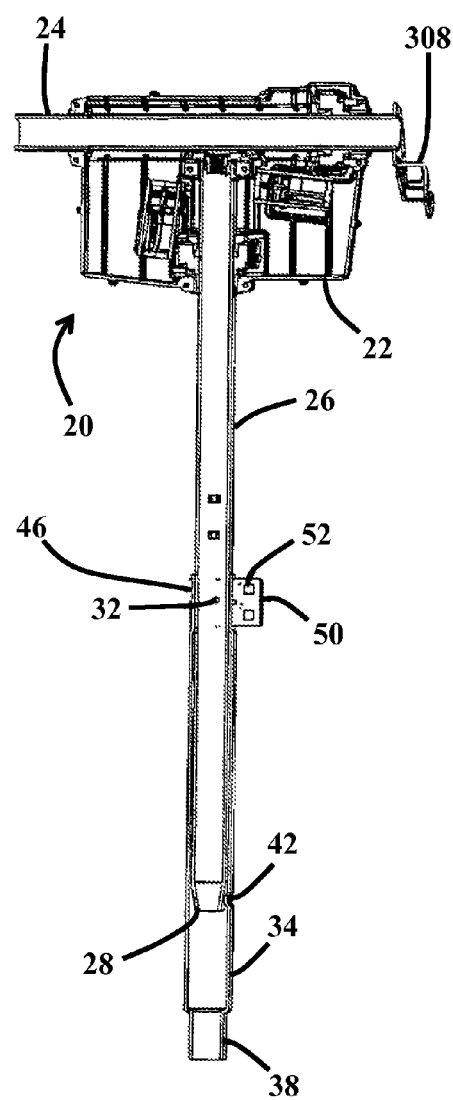
FIG. 24 is a section view of the drive assembly of FIG. 1 taken along longitudinal axes of the elevation and azimuth shafts and showing a mounting arrangement for securing the azimuth shaft to a tubular post.
Figure 25:
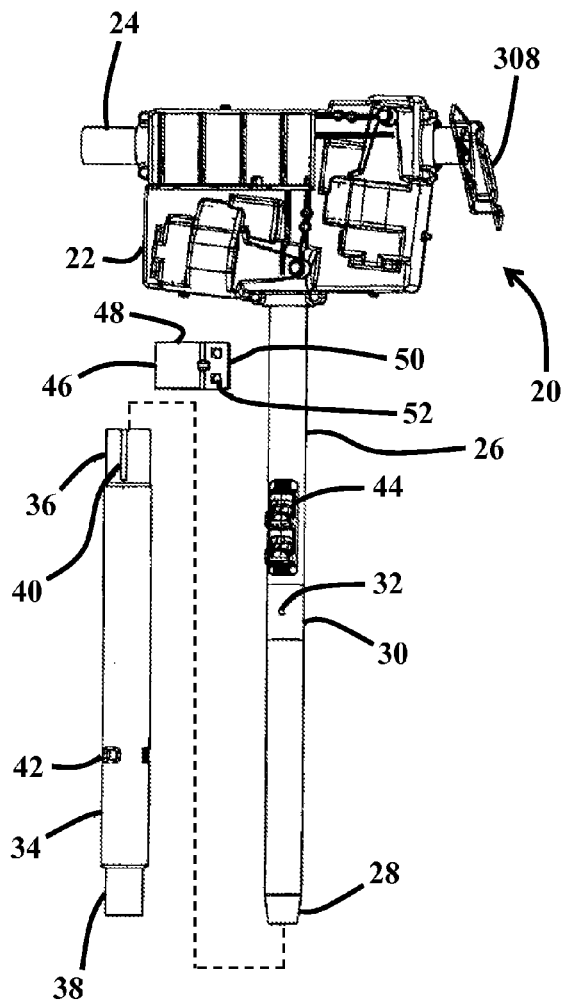
FIG. 25 is an exploded elevation view of the components of FIG. 24.

The tubular mounting post 34 is dimensioned to receive the azimuth shaft 26 therein, as illustrated in FIG. 24. In order to radially orientate the azimuth shaft 26 relative to the mounting post 34, a pin-and-slot mechanism is used. More specifically, the azimuth shaft 26 has a pin 32 press-fit through a pair of aligned apertures in a mid-section thereof and crossing the longitudinal axis thereof. The pin 32 is dimensioned to be received in a longitudinally-extending slot 40 formed in an upper end of the mounting post 34, as illustrated in FIG. 25. When the pin 32 is received in the slot 40, relative rotation between the azimuth shaft 26 and the mounting post 34 is restricted. In order to axially orientate the azimuth shaft 26 relative to the mounting post 34, the azimuth shaft 26 has a tapered bottom end 28 that is engages three equidistant, swaged bosses 42 protruding radially inward in a bottom portion of the mounting post 34, as illustrated in FIG. 24. A clamp 46 extends around a narrowed upper portion 36 of the mounting post 34 to secure the azimuth shaft 26 to the mounting post 34 and to restrict both axial and rotational movement therebetween. The clamp 46 includes a circular portion 48 with a pair of adjacent flanges 50 having bolt holes 52 through which bolts can be used to clamp the flanges 50 together and thereby tighten the circular portion 48 around the narrowed upper portion 36 of the mounting post 34. As the narrowed upper portion 36 of the mounting post 34 also includes the slot 40, the tightening of the clamp 46 can compress the upper portion 36 of the mounting post 34 around the azimuth shaft 26. A knurled band 30 may be formed on the exterior of the azimuth shaft 26 and positioned to be surrounded by the upper portion 36 of the mounting post 34 to further limit movement between the azimuth shaft 26 and the mounting post 34 when the clamp 46 is tightened. The dimensions of the tapered bottom end 28 of the azimuth shaft 26 and the dimensions of the bosses 42 of the mounting post 34 are configured such that the relative position of the elevation tube 24 to the mounting post 34 is consistent when multiple such drive assemblies 20 are to be assembled in an array.

In one alternative, illustrated in FIGS. 26 and 27, a post cap 66 is attached to a bottom portion of the mounting post 34". The post cap 66 has an axially-inward extending structure 68 having four inwardly tapered sidewalls. A similar shaft cap 70 is attached to a bottom portion of the azimuth shaft 26". The shaft cap 70 also has an axially-inward extending structure 72 having four inwardly tapered sidewalls, which is dimensioned to have received therein and be complementary therewith the structure 68 of the post cap 66 when the azimuth shaft 26" is received within the mounting post 34", as illustrated in FIG. 27. The engagement between the two structures 68 and 72 restricts axial movement of the azimuth shaft 26" and the mounting post 34" toward each other, as well as restricting relative rotational movement. In order to restrict axial movement of the azimuth shaft 26" and the mounting post 34" away from each other, as well as ensure centering, a pair of flanged split-sleeve sections 74*a* and 74*b* are inserted into the upper end of the mounting post 34", as illustrated in FIG. 27. The sections 74*a* and 74*b* are dimensioned so as to tightly fit or wedge between the outer diameter of the azimuth shaft 26" and the inner diameter of the mounting post 34". A hammer or mallet may be used to insert the sections 74*a* and 74*b*, such as by hammering on the radially-outward extending flanges at the top portions of the sections 74*a* and 74*b*.

In another alternative, illustrated in FIGS. 28 and 29, a similar type of cap-and-structure engagement is used as in the embodiment described above and as illustrated in FIGS. 26 and 27. That is, the bottom portion of the mounting post 34''' has a post cap 66 with an axially-inward extending structure 68 having four inwardly tapered sidewalls. The bottom portion of the azimuth shaft 26''' has a post cap 70 with a complementary structure 72. The engagement between the two structures 68 and 72 restricts axial movement of the azimuth shaft 26''' and the mounting post 34''' toward each other, as well as restricting relative rotational movement. However, instead of using split-sleeve sections 74a and 74b to limit axial movement of the azimuth shaft 26''' and the mounting post 34''' away from each other, an external circular clamp 80 is used. The clamp 80 is of a similar construction as the clamp 46 described above with respect to the embodiment of FIGS. 24 and 25. The clamp 80 is sized to fit around a narrowed, reduced diameter upper portion 76 of the mounting post 34'''. The narrowed upper portion 76 may include a longitudinally-extending slot 78, which facilitates compression of the upper portion 76 around the azimuth shaft 26''' when the clamp 80 is tightened.

In yet another alternative, illustrated in FIGS. 30-32, the azimuth shaft 26' has a pair of longitudinally-extending slots 54 at the bottom end thereof. The pair of slots 54 are spaced 180 degrees apart, and having their opening facing toward the end of the azimuth shaft 26'. The upper end portion of the mounting post 34' includes an upper pair of transversely-aligned apertures 56a and a lower pair of transversely-aligned apertures 56b. Locking pins 58 are configured to be inserted into the apertures 56a and 56b. The locking pins 58 are of identical construction, each having a rod 62 with a handle 60 at one end. Positioned axially along the rod 62 is a pair of spaced flats 64, as illustrated in FIG. 30. The rod 62 of the locking pin 58 is configured to be inserted into the aligned apertures 56a or 56b, with the handle 60 positioned exteriorly at one side of the mounting post 34' and the opposite end of the rod 62 positioned exteriorly at the other side of the mounting post 34'. The flats 64 are spaced so as to align with the slots 54 when the azimuth shaft 26' is inserted into the mounting post 34'.

When the uppermost rod 62 bottoms out against the top, closed end of the slot 54 of the azimuth shaft 26' (with the lowermost rod 62 also received in the slot 54), the rotational movement as well as the axially toward movement between the azimuth shaft 26' and mounting post 34' is limited by engagement between the slot 54 of the azimuth shaft 26' and the locking pins 58 of the mounting post 34'. In order to limit axially away movement between the azimuth shaft 26' and mounting post 34', the locking pins 58 are rotated to outwardly splay the bottom end of the azimuth shaft 26' into frictional engagement with the adjacent inner diameter of the upper portion of the mounting post 34'. The width of the rod 62 at the location of the flats 64 is less than the width of the rod 62 at a location perpendicular to the flats 64. Further, the width of the slot 54 is sized to receive the width of the rod 62 at the location of the flats 64, but is less than the width of the rod 62 or a location perpendicular to the flats 64. When the azimuth shaft 26' is inserted into the mounting post 34', the locking pins 58 are orientated such that the slot 54 can slide over the portion of the rod 62 having the flats 64, as illustrated in FIG. 31. Once the azimuth shaft 26' is seated, with the uppermost locking pin 58 bottoming out against the upper, closed end of the slot 54, each of the two locking pins 58 can be rotated 90 degrees, such as by using the handles 60, as illustrated in FIG. 32. Rotation of the locking pins 58 by 90 degrees causes the increased-width portion of the rod 62, perpendicular to lesser width at the flats 64, to force the bottom portion of the azimuth shaft 26' outward and into frictional engagement with the adjacent inner diameter of the upper portion of the mounting post 34'

While the invention has been described with reference to specific examples, it will be understood that the invention is not limited to these or any specific examples. For example, while the foregoing embodiments use the terms "elevation shaft" and "azimuth shaft", it will be understood that other types of shaft orientations could readily be substituted and the disclosure herein applied to those types of shaft orientations.

we claim:

1. A heliostat comprising:
   a ground mount;
   a reflector assembly comprising a single mirror and a frame comprising a plurality of longitudinally extending tubes and a plurality of transversely extending tubes, the plurality of transversely extending tubes being perpendicular, and connected to, the plurality of longitudinally extending tubes, the frame rigidly connected to an underside of the single mirror, wherein the frame constrains the mirror in a longitudinal axis and a transverse axis;
   a drive assembly configured to rotate the reflector assembly with respect to the ground mount about a predetermined angular range;
   a mounting mechanism configured to connect the drive assembly to the reflector assembly; the mounting mechanism comprising:
   i) a shaft connected to the drive assembly, wherein the drive assembly is configured to rotate the shaft about a longitudinal axis of rotation;
   ii) an attachment for connecting the frame to the shaft at a fixed angle about the longitudinal axis; and
   iii) a clamp for connecting the shaft to the frame.

2. The heliostat of claim 1, wherein the longitudinal axis of rotation is substantially horizontal.

3. The heliostat of claim 1, wherein the longitudinal axis of rotation is substantially vertical.

4. The heliostat of claim 1, wherein said attachment comprises a bracket.

5. The heliostat of claim 4, wherein said attachment further comprises at least one fastener for connecting the bracket to the frame.

6. The heliostat of claim 5, wherein the fastener is selected from the group consisting of: bolts and screws.

7. The heliostat of claim 1, wherein the angle of the shaft is fixed with respect to the frame by a keyed hole.

* * * * *